United States Patent [19]

Oishi et al.

[11] 4,090,211
[45] May 16, 1978

[54] SELF-DEVELOPING CAMERA AND FILM PACK THEREFORE

[75] Inventors: Yasushi Oishi; Hideo Horiuchi, both of Minami-ashigara; Toshio Goto, Omiya; Yoichi Hamada, Nishinomiya, all of Japan

[73] Assignee: Fuji Photo Film Co., Ltd., Minami-ashigara, Japan

[21] Appl. No.: 527,779

[22] Filed: Nov. 27, 1974

[30] Foreign Application Priority Data

Dec. 29, 1973 Japan .................................. 49-877
Dec. 29, 1973 Japan .................................. 49-878
Dec. 29, 1973 Japan .................................. 49-879

[51] Int. Cl.² ...................... G03B 17/50; G03B 17/26
[52] U.S. Cl. ...................................... 354/86; 96/76 C; 354/276
[58] Field of Search ............... 354/83, 84, 86, 174, 354/178, 179, 276, 277, 301, 303, 304, 305, 85; 96/76 C

[56] References Cited

U.S. PATENT DOCUMENTS

| | | | |
|---|---|---|---|
| 2,572,357 | 10/1951 | Land | 354/86 |
| 2,647,049 | 7/1953 | Land | 96/76 C X |
| 3,630,132 | 12/1971 | Nerwin | 354/179 |
| 3,659,511 | 5/1972 | Nerwin | 96/76 C |
| 3,694,210 | 9/1972 | Nerwin | 96/76 C |
| 3,707,117 | 12/1972 | Moulton et al. | 96/76 C X |
| 3,714,876 | 2/1973 | Nerwin | 354/85 X |
| 3,722,383 | 3/1973 | Van Allen et al. | 354/84 |
| 3,745,900 | 7/1973 | Nerwin | 354/179 X |
| 3,775,127 | 11/1973 | Nerwin | 96/76 C |

Primary Examiner—Fred L. Braun
Attorney, Agent, or Firm—Sughrue, Rothwell, Mion, Zinn and Macpeak

[57] ABSTRACT

A camera which permits film units to be initially stored as a plurality of first sheets and an equal number of second sheets. In taking a photograph, a first sheet is exposed and then transferred into correctly aligned contact with a corresponding second sheet, which may constitute a subsequently sealable folder or envelope for containment of the first sheet, or a cover which is bondable to the first sheet. This transfer of a first sheet is effected entirely independently in the camera, or by a camera mechanism acting on a draw mechanism attached firmly but not fixedly to the first sheet, in this latter case the draw mechanism being detached from the first sheet immediately subsequent to transfer thereof into association with the second sheet. The semifilm unit constituted by the assembled first sheet and second sheet is then removed to the exterior of the camera to form a complete film unit in which, the first sheet and second sheet are bonded together, and, if the semi-film unit is an auto-process type film unit, simultaneous processing thereof is effected during this removal.

7 Claims, 46 Drawing Figures

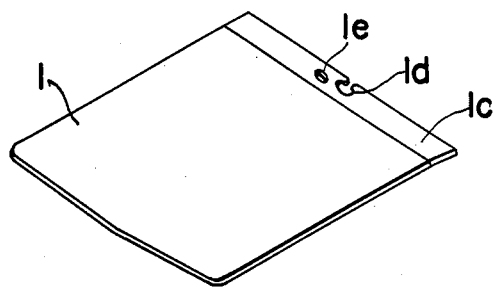
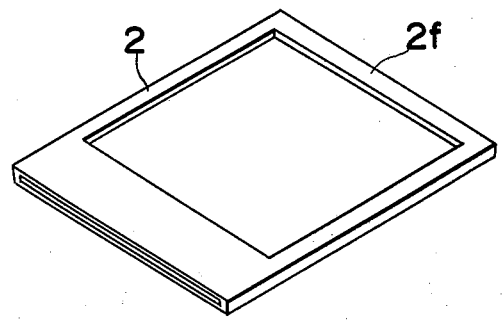
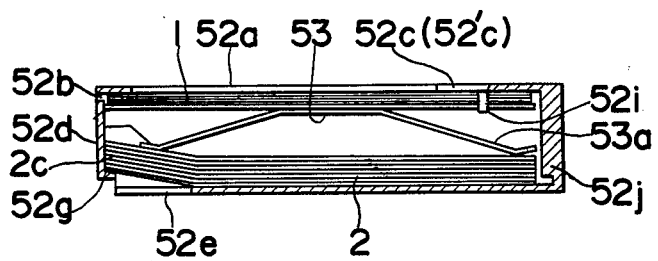
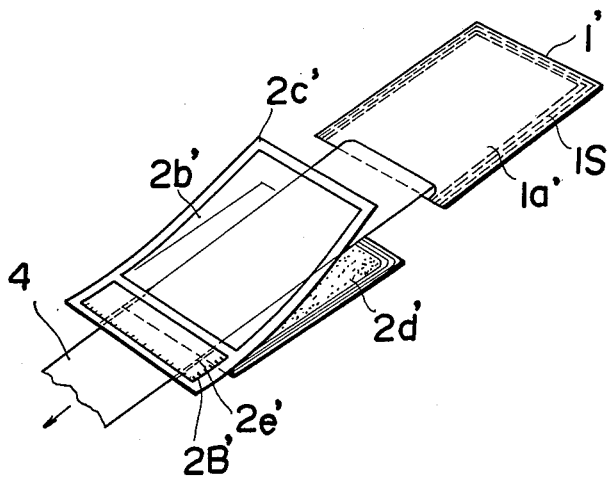

(a)

(b)

(c)

(d)

(a)

(b)

(c)

(a)

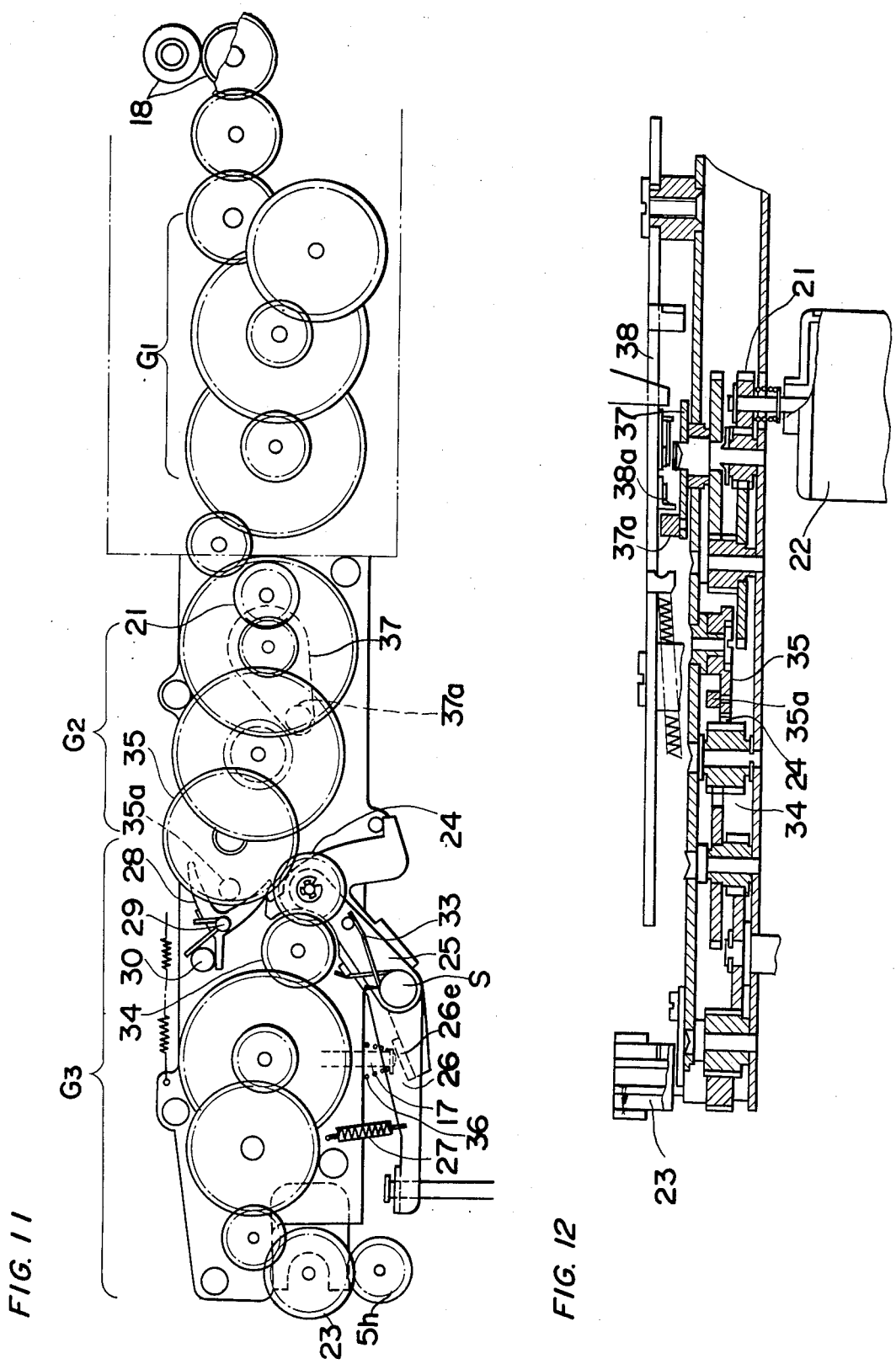

FIG. 15
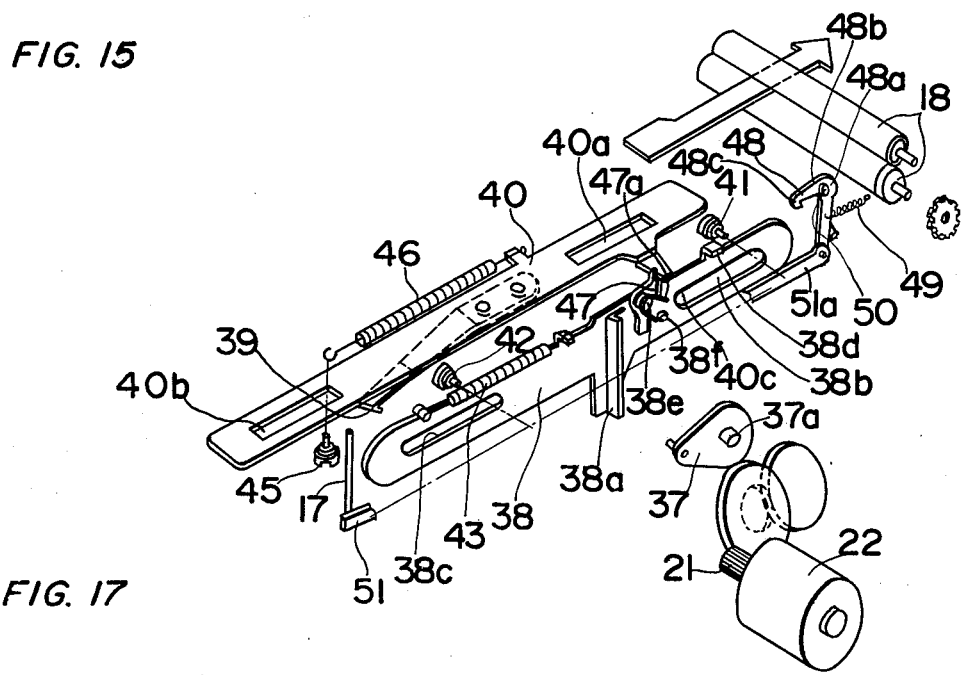
FIG. 17
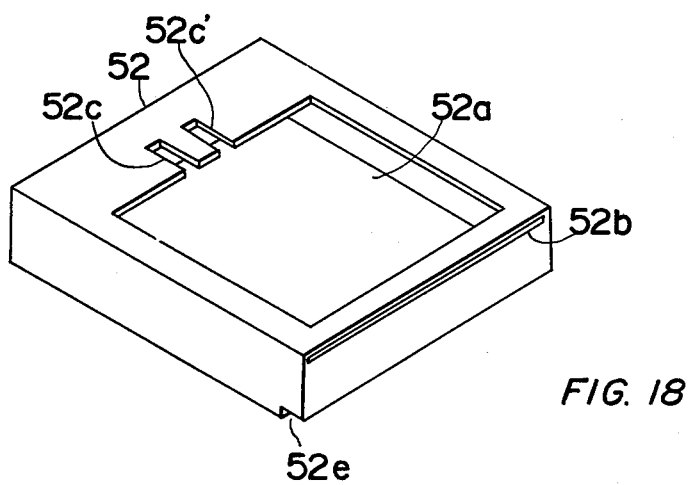
FIG. 18

(b)

FIG. 26 ((f)
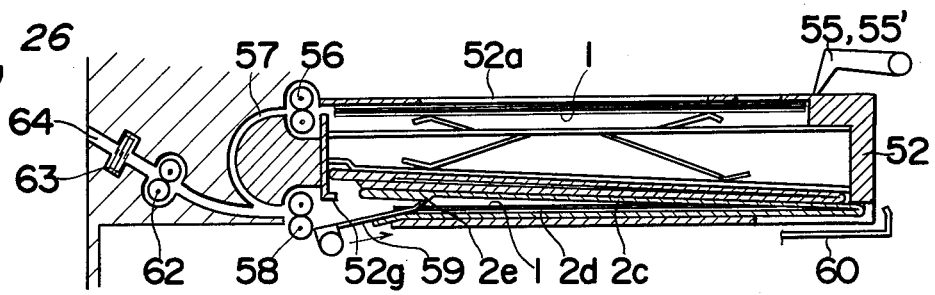
FIG. 26 (g)
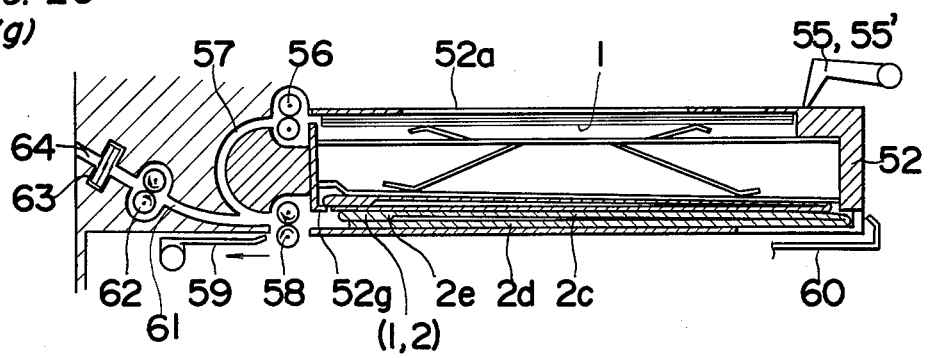
FIG. 26 (h)
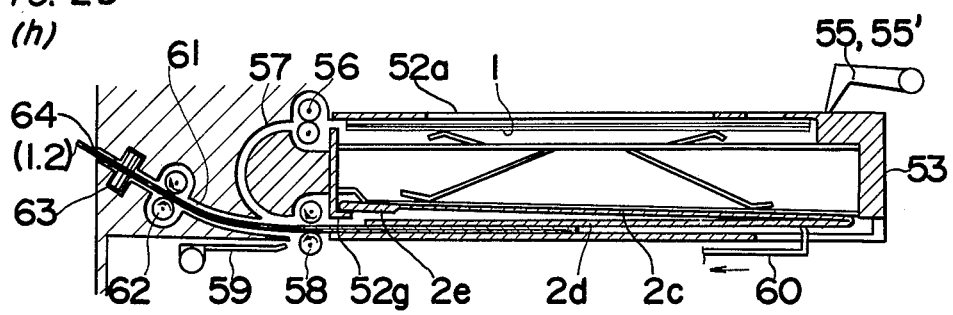
FIG. 28
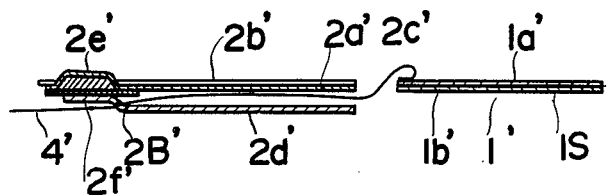

SELF-DEVELOPING CAMERA AND FILM PACK THEREFORE

BACKGROUND OF THE INVENTION

The present invention relates to a photographic method and apparatus, and more particularly to a photographic method, film pack and camera wherein film units for the production of individual photographs are constituted by first sheets each comprising a photosensitive layer and an equal number of second sheets associated with developing solution containers which, when initially loaded in a camera, are held separate from one another, successive photographs being produced by exposure of successive first sheets, which are then transferred into contact with successive second sheets, so as to cover the photosensitive layers of first sheets with second sheets in facing contact with each other, thereby to form successive assembled independent semi-film units, which are placed apart from and physically separated from first sheets, and, in turn, subsequently removed from the camera while being simultaneously processed with developing solution of containers to produce complete film units.

There are known conventionally, various photographic methods and apparatus, which are frequently referred to as 'auto-processing' and 'auto-process cameras', whereby development of an exposed film is effected within a camera, thus permitting a photographer to obtain an image of an object photographed in a very short time after the shot is taken, without having to go to a separate establishment for film development.

According to a known auto-processing, development as well as exposure of a film is carried out inside a camera, and a film is provided not in a continuous roll but as a series of individual film units, which may or may not be linked to one another, and a plurality of which are usually held in a pack or similar container which is loadable in a camera, each film unit being for the production of one photograph, and comprising at least a photosensitive layer which is exposable to produce a negative image of an object, a transfer layer, which is in immediate or close juxtaposition to the photosensitive layer, and onto which a viewable image corresponding to the negative image of the photosensitive layer may be diffused and transferred under the action of a processing solution spread between the layers, and a pod, which contains a requisite solution for effecting this diffusion and transfer. In an auto-process, for each photograph, the photosensitive layer of a film unit is exposed, and this film unit is then moved out of the pack, the other film units remaining in the pack, and is passed through pressure means such as rolls, which are provided in a camera, and cause the processing solution pod of the film unit to be broken open and the solution to be spread between the film layers, while at the same time pressing the layers together, and forwarding the film unit to the exterior of the camera, these steps taking place in a short time. In principle, employment of an auto-process camera as opposed to for example, a camera associated with tank-developed roll film, presents a main advantage in that a photographer obtains a photographic print almost immediately after exposure of each film unit, without the trouble and expense of going to a separate establishment for development of film. However, while representing a definite technical advance in some respects, conventional auto-process cameras still have drawbacks, either with regard to ease of handling, or to quality of prints obtained.

For example, one representative type of conventional auto-process camera exploys film units, which each comprise at least a photosensitive sheet, a transfer image sheet, and a pod containing processing solution, and which are provided in a cassette or pack which is loadable in the camera, the film units in the pack being linked in a continuous series by comparatively thin sheets of tape or paper termed leaders, which are light-proof, and which are normally doubled between successive film units, or behind successive photosensitive sheets, there also being a leader doubled in front of the foremost film unit prior to loading of the pack into the camera. With this camera, for each photograph taken, the leader in front of a film unit is drawn out a certain amount to uncover the film unit, the film unit is exposed, and then the leader is drawn out further in order to pull the exposed film unit first through processing rolls provided in the camera, and then out of the camera, leaders and film units usually being connected in such a manner that drawing-out of an exposed film unit from the camera causes the next film unit in the pack to be uncovered. This drawing-out of successive leaders, and so of successive film units must be effected by the photographer, which apart from being troublesome, also tends to be unsatisfactory, since it is evidently impossible to guarantee that all exposed film units will be drawn through the processing rolls at the same rate, and processing of different film units, or even of different portions of one and the same film unit may fail to be uniform. Even supposing that film unit processing is susceptible of being rendered more uniform, for example by the provision of extra drive means associated with the processing rolls, this type of camera still has a particular disadvantage in that initial loading of film packs thereinto is fastidious and somewhat difficult, since before the camera can function the photographer must thread a leader between the processing rolls and through a passage to the exterior of the camera. Also, since, during use of the camera, there is always a leader extending from the film pack loaded therein, through the processing rolls, to the exterior of the camera, as long as there are still film units remaining in the pack, it is very difficult to unload the pack without risk of damage to camera parts. This is inconvenient when, for example, there are only one or two unexposed film units left in the camera, and a photographer anticipates taking 6 – 8 shots in rapid succession, and so wishes to load the camera ready with a pack having a full complement of film units, or when a photographer wishes to immediately employ film units having a sensitivity to light, or other characteristics, different from those of film units currently loaded in the camera. Further disadvantages of this type of camera are that, in order to obtain useable prints, a photographer is usually obliged to separate the photosensitive sheets and transfer sheets of processed film units a certain time after extraction of the film units from the camera, and that a processed film unit is always accompanied by a leader which must be detached, in addition to this, either a photographer has the trouble of disposing of the leaders, and possibly of a photosensitive sheets also, or these elements are simply discarded and become litter, which is obviously undesirable.

In another representative type of conventional auto-process camera, film units are provided as a set of unconnected units, termed monosheets, which are each an individual combination of at least a photosensitive layer for production of a negative image, a transfer layer for production of a corresponding useable image, and a processing solution pod, and which are exposed, processed and moved out of the camera automatically, the only action required of a photographer being depression of the camera shutter button, and each successive exposed monosheet being moved independently of other monosheets in the camera, and brought out of the camera unaccompanied by leaders or other unrequired elements. This type of camera has the advantages that loading or unloading of film packs thereinto or therefrom is comparatively straightforward, that actions required of a photographer are minimum, and that there is not objectionable litter. However, this type of auto-process camera has a principal disadvantage in that, since the monosheets associated therewith are each a complete unit comprising all necessary elements for production of a photograph, different portions of each monosheet have different thicknesses, in particular the processing solution pod usually being thicker than the rest of the monosheet, with the result that when a plurality of monosheets are held in a pack, if the foremost monosheet is to be in suitably flat alignment for correct exposure, it is necessary to apply comparatively high forward or feed pressure on the monosheets, and even then it is difficult to guarantee suitable flatness of film units, and hence production of satisfactorily sharp images. Also, because of the comparatively strong pressure applied on monosheets, qualities of photosensitive layers thereof may be impaired if the monosheets are stored for a long time. Another disadvantage is that since in producing a photograph with a monosheet employed in this type of camera light passes through the transfer layer to produce an image on the photosensitive layer, and this image is subsequently diffused back to the transfer layer, the camera lens system must include a mirror or mirrors if a print carrying a correct image is to be obtained.

Accordingly, the essential object of the present invention is to provide a photographic method and apparatus which eliminates the disadvantages inherent in conventional auto-processing methods and also presents other novel advantages.

In more detail, objects of the present invention are to provide a photographic method and apparatus enjoyable great advantages such that;

a plurality of first sheets each comprising a photosensitive layer may merely be packed together, in disregard to the developing solution containers, and easily maintained in good flat alignment, whereby successive last sheets may be exposed without risk of formation of ghost images, first sheets having photosensitive layers are stored separately and out of contact with second sheets prior to use, whereby the risk of deterioration of film quality during long storage is minimized;

each successive first sheet is transferred, after exposure thereof, to a second sheet, which is located in another part of the camera, which covers and protects the photosensitive layer of the first sheet, and with which there is associated a container of chemical developing solution which my be spread between the first and second sheets, whereby there is formed a semi-film unit, which is independent of other first sheets and second sheets, semi-film units being processable to give immediately useable prints in cameras wherein light for exposure of film is directed thereonto by normal geometrical optical system to form positive images, or wherein light is directed onto film by an optical system including a mirror or mirrors, to revert light rays and produce mirror images;

each independent semi-film unit is transferred to the exterior of the camera without attendant unrequired material such as leaders, and processed and developed during this transfer to form a complete film unit, whereby film is automatically processed immediately after exposure thereof, and a photographer may take shots in rapid succession;

a complete film unit which has been removed from a camera comprising a negative film portion, which is protected, but is easily separable from the positive print portion, and may be subsequently employed to produce further copies of a photograph.

It is another object of the present invention to provide a film pack wherein photosensitive sheet portion of semi-film units may be held separately from other film unit portions, and are easily held in a correct alignment for exposure, and wherefrom successive semi-film units, which are formed by successive exposed photosensitive sheets transferred into successive envelopes providing lightproof protection therefor, may be removed and directed outside of the camera, without leaders being necessary, each semi-film unit being removed completely independently of other film units.

The corresponding envelope also may have various structures, to match different structures of the photosensitive sheet, and meet various purposes. For example, the envelope may be simply a completely opaque cover providing lightproof protection for a photosensitive sheet, or, inside the opening of the envelope, there may be provided a container holding processing solution for effecting diffusion-transfer of an image in an auto-process photosensitive sheet, or one side of the envelope may constitute a transfer sheet, onto which an image may be diffused and transferred from a photosensitive sheet inserted in the envelope.

It is a further object of the invention to provide a camera which permits separate storing of one or more first sheets each comprising a photosensitive layer exposable to form a negative image, and of an equal number of second sheets each associable with a processing solution pod and comprising a lightproof layer and, optionally, a layer for formation of an image by diffusion-transfer process, which comprises a lens and shutter means permitting exposure of successive first sheets, and which, upon exposure of each successive first sheet effects a sequence of actions comprising moving the exposed first sheet into correctly aligned assembly with a corresponding second sheet, to constitute a semi-film unit that is unattached to elements of other film units in the camera, and then moving this independent, semi-film unit through processing means provided in the camera, and directing the film unit to the exterior of the camera.

It is another object of the invention to provide a camera comprising time-, or switch-controlled means for effecting the abovedescribed actions in the required sequence.

It is a still further object of the invention to provide a camera permitting film unit portions for formation of negative images to be initially stored separately from other film unit portions, whereby film unit negative image portions may be constructed to each have an even cross-section, and so be easily held in an alignment ensuring correct exposure thereof.

It is yet another object of the invention to provide a camera which is not limited to association with only one type of film, but is associable with various types of auto-process film unit or of tank-developed film unit.

It is still further object of the invention to provide a camera which permits a varied camera construction and in which a lens system may include or may dispense with a mirror or mirrors, according to different requirements and structural combinations of film units employed.

In accomplishing these and other objects, there is provided, according to the present invention, a photographic method and means wherein each semi-film unit to be assembled for production of a single photograph, is constituted by a first sheet, and a second sheet, which is connectable to the first sheet, through a leader, but is maintained physically separate therefrom prior to a photograph being taken, and is associated with a breakable container holding a processing solution, the first sheet and second sheet are brought together to form a semi-film unit only after exposure of the first sheet to produce a negative image thereon. Subsequently, this semi-film unit is removed from the camera while being simultaneously processed to form a complete film unit. Each semi-film unit as a whole comprises at least for the formation of a negative image of a desired object, a layer on which a positive image of the object may be formed by diffusion-transfer from the negative layer, under the influence of the processing solution, a support layer, and a lightproof protective layer. Other layers, such as a spacer, may also be included, to meet various purposes. The negative image layer is always included in the first sheet, the positive image layer and lightproof protective layer may be included in the first sheet or in the second sheet, and a support layer may be included in either the first sheet or the second sheets, or both.

According to the present invention, there is provided a camera having a known lens system and shutter means, and providing accommodation for a pack containing a plurality of semi-film units, each of which is constituted by a first sheet, which is initially held in a forward portion of the pack, and a second sheet, which is held in a rear portion of the pack, is initially separate from the first sheet, and is provided either as a single sheet, or as a main second sheet and a subsidiary second sheet which are initially in partial attachment to one another and constitute a subsequently completely sealable envelope for containment of the first sheet. If it is required to use the camera of the invention for auto-processing, each semi-film unit comprises a photosensitive layer, which is exposable to form a negative image, and is always included in the first sheet of the film unit, at least one lightproof layer, which is associable either with the first sheet or with the second sheet, or with both, an image transfer layer, which is included either in the first sheet or in the second sheet, and a processing solution pod, which is associated with the second sheet.

Alternatively, the first sheet may be simply a film which is developable in a tank-process, and the second sheet constitute a lightproof envelope which may contain the first sheet, and is sealable to provide complete lightproof protection therefore.

In taking a photograph, the camera shutter means is actuated to expose the photosensitive layer in the first sheet or a semi-film unit, and then a means provided in the camera, which acts either directly on the exposed first sheet, or actuates a first sheet shift means provided in the loaded pack containing the film units, moves the exposed first sheet into contact with, or into the envelope constituted by a corresponding second sheet, this first sheet and second sheet constituting a independent semi-film unit which is ready for processing, and which, although contacted by the second sheet of another film unit, is in no way attached to other film unit elements, and may be moved independently of other film units, and unaccompanied by any unrequired elements which must be subsequently detached and disposed of. This semi-film unit is then moved out of the pack by a means provided in the camera, and into engagement with processing means, which also are provided in the camera, and which serve to bond the first sheet and second sheet together, or to seal the envelope constituted by the second sheet, and to cause processing from the pod associated with the second sheet to be spread through the film unit, or, if the first sheet is a tank-developed film, simply to seal the envelope constituted by the second sheet, while simultaneously forwarding the film unit to the exterior of the camera, where it is made available to the photographer.

Thus, a plurality of semi-film units, when initially loaded into a camera of the invention, are constituted by a certain number of first sheets held in a camera first location, wherein the first sheets may be exposed to light directed into the camera by the camera lens system, and an equal number of second sheets held separately from the first sheets in a second location, and as successive shots are taken, successive first sheets are exposed, then transferred from the first location to the second location and therein brought into association with successive second sheets to constitute successive independent film units, which are then moved out of the camera, while simultaneously being processed or not, according to the type of film.

One appreciable advantage offered by the invention is that by making it possible for different portions of film units to be initially stored separately from one another, those portions of a film unit which are of uneven thickness or shape, e.g., the processing solution pod, may be associated with the film unit second sheet in the camera second location, i.e., away from the first location where exposure takes place, and first sheet construction may be made flat, even if the first sheet comprises a plurality of layers, and the first sheet may therefore be easily and accurately held in an alignment ensuring correct exposure. For each film unit, therefore, the main function of the second sheet is to provide a support or envelope for an exposed first sheet, and to carry or be associated with any film unit uneven portions such as the processing solution pod, in addition to which the second sheet may or may not include active portions of a semi-film unit.

For example, a suitable film unit construction when the optical system of the camera comprises a mirror or mirrors for image reversal is that the first sheet comprises a transparent support layer, a photosensitive layer, which is coated on one side of the support layer, and a lightproof, protective layer which is coated on, or incorporated in, and backs, the photosensitive layer, comprises, for example, a hydrophilic colloid containing a light-absorbent substance, and which although lightproof is permeable to a processing solution, the function of this lightproof layer being to prevent fogging of other first sheets loaded to the rear of the first sheet being exposed. The first sheet is initially positioned with the transparent support layer there of foremost, thus permitting exposure of the photosensitive layer and formation of an image therein. The corresponding second sheet, which as noted earlier is held in the second location and is physically separate from the first sheet prior to a photograph being taken is associated with a pod holding processing solution, and is constituted by a main second sheet comprising a transparent support layer backed by a positive image layer on which a photographic image may be formed by diffusion-transfer process, and a subsidiary second sheet, which is made of a lightproof material, and which, prior to a photograph being taken is in partial attachment, for example, along three edges, to the main second sheet, whereby the main second sheet and subsidiary second sheet together constitute an envelope in which the first sheet is containable, the second sheet transparent support layer being foremost and the subsidiary second sheet being rearmost in the normal loaded position of the second sheet. After exposure, the first sheet is moved out of the first location, caused to make a U-turn and to flip over, whereby the lightproof layer thereof is brought foremost, and the first sheet is then inserted into the envelope constituted by the second sheet, the first sheet protective layer thus being brought into contact with the second sheet positive image layer, and the first sheet transparent support layer being brought into contact with the lightproof subsidiary second sheet, i.e., the first sheet photosensitive layer carrying a negative image is now contained between two lightproof layers. Subsequently, this single film unit constituted by the first sheet and second sheet is moved from the camera, and during this removal the processing solution pod is broken open by means provided in the camera, whereby an image is diffused and transferred to the second sheet positive image layer, and the main second sheet and subsidiary second sheet are completely bonded together, there thus being made available outside the camera a positive image of the object photographed which is viewable through the transparent support layer of the second sheet, and a negative image of the object, which is protected between two lightproof layers, and which may, if subsequently required, be separated from the positive print, and used to obtain further copies of the same photograph. In association with this and other types of film unit there is provided means for moving successive first sheets into a position for exposure, and successive second sheets into a position for receiving exposed first sheets, such means being conveniently constituted by, for example, a single spring means acting in opposite directions, which press forwardly on the first sheets and rearwardly on the second sheets.

In another type of semi-film unit construction which may be suitably employed when the camera optical system includes a mirror or mirrors, the first sheet is constituted by a photosensitive layer for the formation of a negative image coated on the forward side of a support layer, which is permeable to processing solution and contains a light-absorbent substance, for example, polyethylene terephthalate film-base containing carbon black, and the second sheet is as described above, i.e., it is associated with a processing solution pod, and includes a main second sheet, which comprises a layer for formation of a positive image coated on the rear side of a transparent support layer, and constitutes an envelope together with a rearmost, lightproof subsidiary second sheet. With this film construction also, after exposure of the first sheet, the first sheet is moved out of the first location, reversed, and moved into the envelope constituted by the second sheet in the second location, the photosensitive layer and light-absorbent support layer of the first sheet thus being brought into juxtaposition with the lightproof subsidiary second sheet and the main second sheet positive image layer, respectively, after which this independent film unit constituted by the first sheet and second sheet is moved out of the camera, while being simultaneously processed, as described above.

In another suitable construction of a semi-film unit employable in a camera according to the invention, the first sheet comprises five layers. In the initial loaded position of the first sheet these layers, going from front to rear, are a photosensitive layer, a lightproof layer containing a substance which is light-absorbent and permeable to processing solution, a layer for reflection of white light, which also is permeable to processing solution, a layer for formation of a positive image, and a transparent support layer. The corresponding second sheet is simply a support sheet, which may be lightproof, is bondable to the first sheet, and has attached a container holding processing solution. When the foremost, photosensitive layer of the first sheet has been exposed, the first sheet is turned over, and transferred to the second location and brought into flat contact with the second sheet, the first sheet photosensitive layer being in immediate juxtaposition to the second sheet, and the first sheet transparent support layer now being foremost. Next, the first and second sheet are moved out of the camera as a single film unit, and during this movement the processing solution pod attached to the second sheet is broken open by rolls, or similar pressure means provided in the camera, which cause the processing solution to be spread throughout the first sheet, whereby an image of the photographed object is produced by diffusion-transfer process on the positive image layer of the first sheet, and is viewable through the first sheet transparent support layer, and which also cause the first and second sheets to be bonded together.

Another type of film that may be employed is ordinary colour, or black and white film developable in a tank-process, in which case the first sheet may comprise, for example, a layer for reflection of white light and a silver halide emulsion layer successively coated on a lightproof support, and the second sheet, or the first sheet may not include a lightproof layer, and the second sheet comprise a main second sheet and a subsidiary second sheet both made of a lightproof material and together constituting an envelope for containment of the first sheet.

Needless to say, the actual physical or chemical compositions of different layers of a first sheet or second sheet of a film unit, or of a processing solution, may be any suitable known compositions to meet different requirements. For example, in the production of black and white photographs in a diffusion-transfer process, the photosensitive layer may be a silver halide emulsion, the positive image layer include a suspension of silver particles to act as nuclei for the development of an image, and the processing solution contains a developing chemical and silver halide solution. In the production of colour photographs by diffusion-transfer process, the photosensitive layer may be a combination of a silver halide emulsion with pigment donor substances for production of different components of a colour image (e.g., a compound for production or promotion of colour elements upon oxidation and reaction of a coupler for production of diffusable colour elements, and a colour developer), the positive image layer may include a medium for fixing colour elements, and the processing solution may be an alkali solution composition including components for promotion of development and colour donor substances.

In order to retain photosensitive sheets and envelopes in their respective positions, regardless of the attitude of the camera in which they are loaded, and to move an exposed photosensitive sheet independently of other photosensitive sheets and position it smoothly and accurately in an envelope positioned to receive the exposed photosensitive sheet, thereby to form a complete film unit, after which it must be possible to move only this film unit accurately from the camera, according to the present invention there is provided a pack which is made of a lightproof material, and the interior of which comprises a first space and a second space. The first space is defined by the inner side of a first wall, in which there is formed an exposure opening, and provides accommodation for a plurality of photosensitive sheets, each of which comprises a photosensitive layer, and which are held in place, and urged towards the pack first wall by a pressure plate. The second space is defined by the inner side of a second wall opposite to the first wall, and provides accommodation for a plurality of envelopes, comprises an opening permitting insertion of a photosensitive sheet thereinto, has at least one side made of a lightproof material, in order to provide lightproof cover for a photosensitive sheet contained therein, the envelopes being held in place, and urged towards the second wall by a pressure means. The pack also comprises a passage section, which is formed at the side of the pack towards which the openings of the envelopes face, and provides communication between the first and second spaces, and a removal opening, which is located in line with an envelope immediately in contact with the second wall. After exposure and formation of a negative image on the photosensitive sheet which is positioned against the pack exposure opening, the exposed photosensitive sheet is moved through the passage section and inserted into the envelope which is currently in immediate contact with the second wall, thereby forming, in the second space, a single film unit, which is independent of the other envelopes.

Corresponding envelopes for containing photosensitive sheets each have an opening permitting insertion of at least one photosensitive sheet and is each able to provide complete lightproof protection for at least one side of a photosensitive sheet contained therein. Each envelope may, for example, have two sides made of a lightproof material, and so constitute a completely opaque cover for a photosensitive sheet, or may have one side made of a lightproof material, while the other side thereof constitutes a layer on which a colour or black and white image may be produced by diffusion-transfer process, and in this case a container which holds processing solution may be attached to the inner side of the transfer image sheet, near the opening of the envelope, whereby each envelope together with an exposed photosensitive sheet may constitute an auto-process film unit.

The pressure plate and pressure means associated with the first space and second space respectively may be constituted a separate spring means, or may be different portions of one and the same spring means, which exerts pressure both on photosensitive sheets and on envelopes, and ensures that the photosensitive sheets and the envelopes are held in position regardless of the attitude of the camera in which the pack is loaded. The passage section providing communication between the pack first and second spaces, and permitting transfer of an exposed photosensitive sheet into an envelope may extend through, or be formed at the inner side of a pack side wall. The passage section may also be constituted by passages which communicate with the first and second spaces and with a passageway formed in a camera, in which case, to transfer an exposed photosensitive sheet into an envelope, the photosensitive sheet is first moved out of the pack, and through the passageway into the camera, and then re-inserted into the pack and directed into the envelope.

Also in this case, if the end of the envelope which an exposed photosensitive sheet first enters when inserted into the envelope is the same end as that which leads when the independent film unit constituted by the photosensitive sheet in the envelope is withdrawn from the pack, the opening between the passage section and the second space can serve as a film unit withdrawal opening, as well as a photosensitive sheet insertion opening. Also, this film unit removal opening must, of course, ensure that, after constitution of each film unit by an exposed photosensitive sheet inserted in an envelope, only one film unit at a time is removed, and it must be ensured that other, unrequired envelopes are not drawn out with a film unit being withdrawn.

As noted above, film units are conveniently stored initially in a pack which is loadable in a camera, and successive first sheets are moved, after exposure thereof, into association with successive second sheets to form successive independent film units for subsequent removal and processing, there being provided spring or similar means for moving each successive first sheet into a position for exposure upon exposure and removal of the preceding first sheet, and for moving each successive second sheet into a position for reception of a first sheet upon removal of the preceding second sheet and first sheet associated therewith. According to the invention, transfer of exposed first sheets to corresponding second sheets may be effected in a manner employing leaders, in which case first sheets are initially linked by leaders, which are provided in the film unit pack and pull successive first sheets to the location of corresponding second sheets, or in a manner in which leaders are not employed, in which case first sheets are unattached to one another, and are transferred to the corresponding second sheets by means provided in the camera and external to the pack. In both modes of transfer the second sheets are unattached to one another, and the first sheets are caused to describe a U-turn while being transferred to the corresponding second sheets.

When leaders are employed, semi-film units are initially contained in a pack which comprises a portion for containment of used leaders and accommodation for a reel or similar means for wind-up of leaders, there being one leader associated with each first sheet. Each leader is fixedly attached at an intermediate point to a slack portion connecting to the leader associated with the next first sheet, and is firmly, but not permanently attached at one end to a first sheet, and passes through an end portion of the pack, along the length of a corresponding second sheet, and also therethrough if the second sheet constitutes an envelope, and then passes through a slit formed at an end of the second sheet, the other end of the leader being taken up on the wind-up reel provided in the pack. The leader slit formed in the second sheet is not wide enough to permit passage of a first sheet, but only of a leader, and, if the second sheet constitute an envelope, it is formed at the closed end of the envelope, or, if the second sheet is a single sheet, it is formed in a turned-back end portion of the second sheet, or in a small block portion provided on one end of the second sheet. When a foremost first sheet is exposed, the leader wind-up means in the pack is actuated by a means provided in the camera, whereby the first sheet is drawn by the leader from the foremost position, guided round one end of the pack, while still remaining in the pack, and then drawn into the envelope, or into contact with the cover constituted by the corresponding second sheet, which is the rearmost second sheet, the slack portion also being wound up during this action. When the first sheet has been drawn into correct alignment with the second sheet, further movement of the first sheet relative to the second sheet is prevented by contact of one end of the first sheet with the sealed or blocking end of the second sheet in which the leader slit is formed. The leader continues to be wound up however, and so is pulled out of attachment with the first sheet and through the leader slit of the second sheet, whereby the first and second sheets remain as an independent semi-film unit which is not attached to, although in contact with, other film unit elements. This stage of wind-up of the leader is detected by a means provided in the camera, which also causes actuation of the leader wind-up means to stop, the leader of the next first sheet now being linked to the leader wind-up means by the slack portion which is connected thereto, and which by now has been completely or almost completely taken up on the leader wind-up means. After this the film unit constituted by the assembled first sheet and second sheet is moved by means provided in the camera through a removal slot formed in the pack, and into contact with processing means as described above, and then out of the camera, via a suitable extractigon passage.

In another embodiment of the invention, first sheets initially loaded in a pack are in contact with one another, but are not attached to one another. After exposure of a foremost first sheet, means provided in the camera move the first sheet out of the pack via a first sheet slit formed at one end of the pack, through a U-shaped passage formed in the camera, and then into the pack again, and into, or into contact with, the rearmost second sheet, via a transfer opening, which is formed in the pack in line with the rearmost second sheet, and which also permits removal of an independent film unit from the pack. When the first sheet has been moved completely into a correct positional relationship with the second sheet, the first and second sheets are moved out together as a single film unit, via the pack transfer opening, and then into and through a suitable passage formed in the camera, while being simultaneously processed. Time sequence control of this series of actions is suitably effected by various cam means acting on the various elements for effecting the actions. In this embodiment of the invention economy of parts and space is achieved since the same elements are employed both for shifting an exposed first sheet into association with a corresponding second sheet, and for moving an assembled film unit from the pack and out of the camera.

In a further embodiment of the invention, exposed first sheets are moved into association with second sheets by leaders provided in the pack as described earlier, but the entire action is controlled electronically, there being provided means by which clutches or similar elements supplying drive to the various shift and transfer means are actuated in a timed sequence subsequent to actuation of the camera shutter means to take a photograph.

It is to be noted that according to the invention, the photosensitive layer for formation of a negative image in a semi-film unit may, in effect, be located in front of or behind the film unit positive image layer, depending on the combination of first sheet construction and second sheet construction, whereby different types of film unit and different types of camera, for example, including or not including a mirror or mirrors in the optical system thereof, may be employed in accordance with different requirements. Also, loading or temporary unloading of film units is easy, since film units may be provided in a pack which, as far as the photographer is concerned, is merely a unitary block which may be simply inserted into or removed from a camera, without fine adjustments or fastidious attachment or fitting of small parts being necessary. Further, with a camera according to the invention, whatever the mode of first sheet transfer to a second sheet, or of removal of a single film unit, the only action required of a photographer in taking a photograph is to aim the camera and actuate the shutter button.

A better understanding of the present invention may be had from the following full description of several preferred embodiments thereof, when read with reference to the attached drawings, in which like numbers refer to like parts, and FIGS. 1(a) and (b) are perspective views showing basic construction of two components of a semi-film unit employable in a camera according to the invention;

FIGS. 2(a) to (d) are greatly enlarged cross-sectional views of a first sheet and of a second sheet of a semi-film unit employable in association with a first embodiment of the invention and illustrates stages of transfer of an exposed first sheet into association with a second sheet;

FIGS. 3(a) to (c) are views similar to FIG. 2 and show a semi-film unit associable with a second embodiment of the invention;

Figure 8:
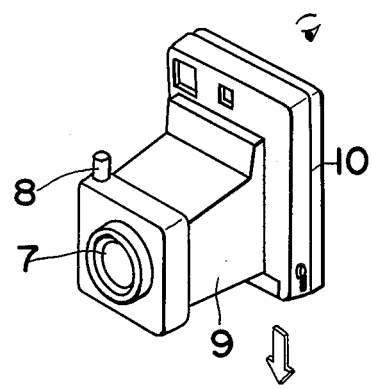
Figure 9:
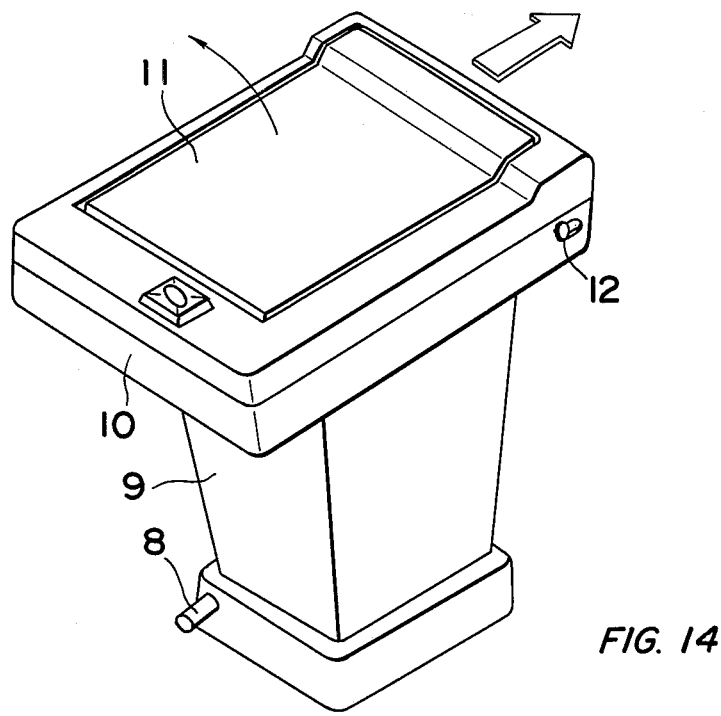
Figure 14:
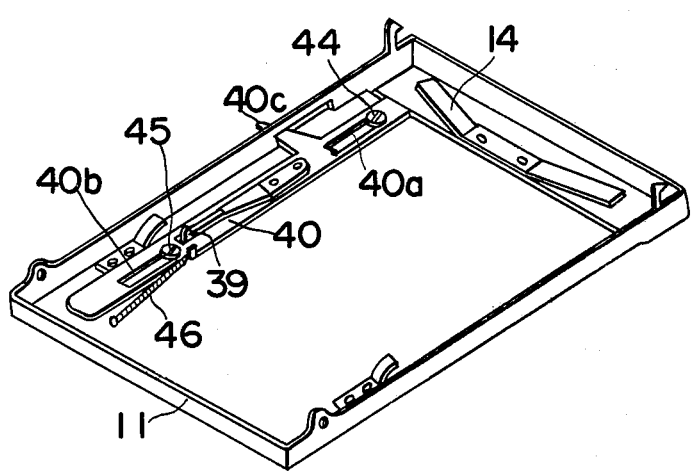
Figure 7:
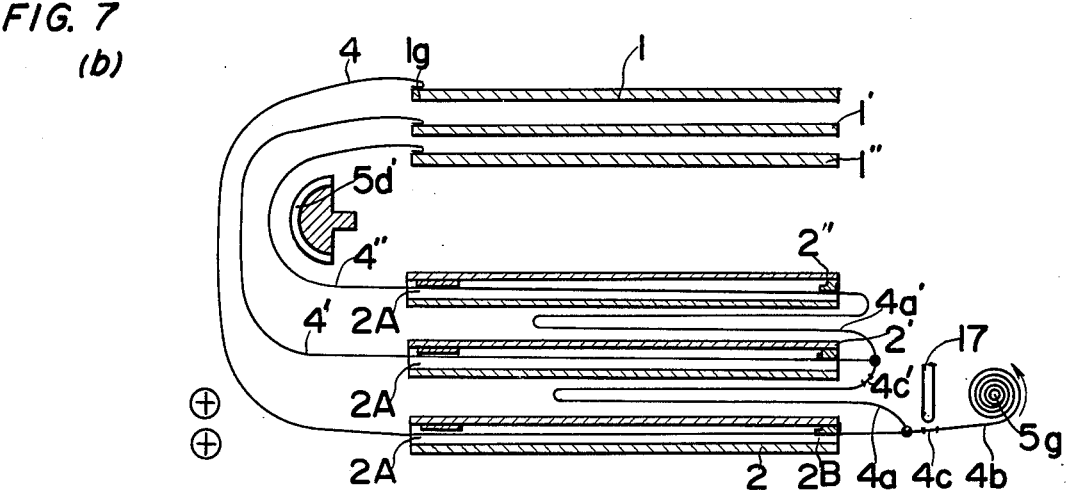
Figure 7:
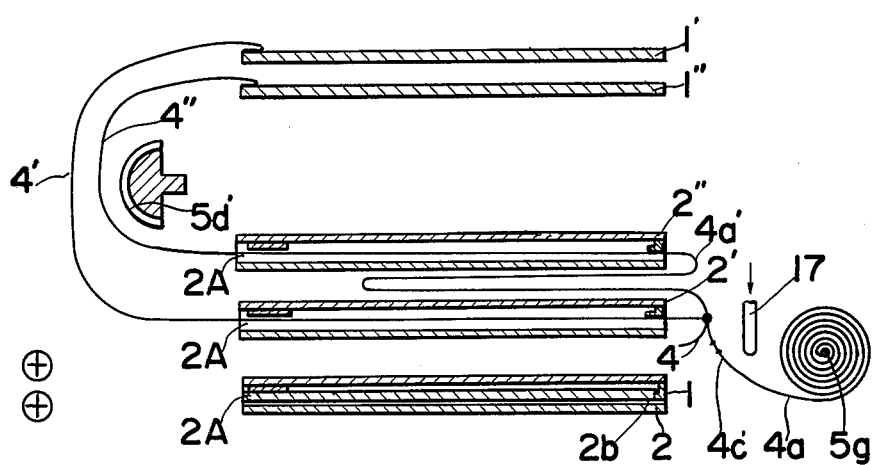
Figure 7:
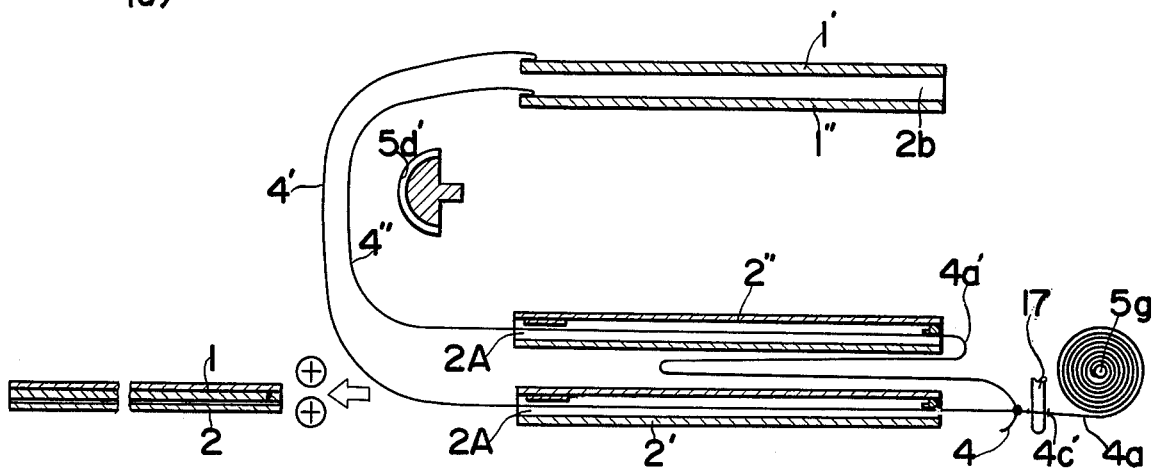
Figure 10:
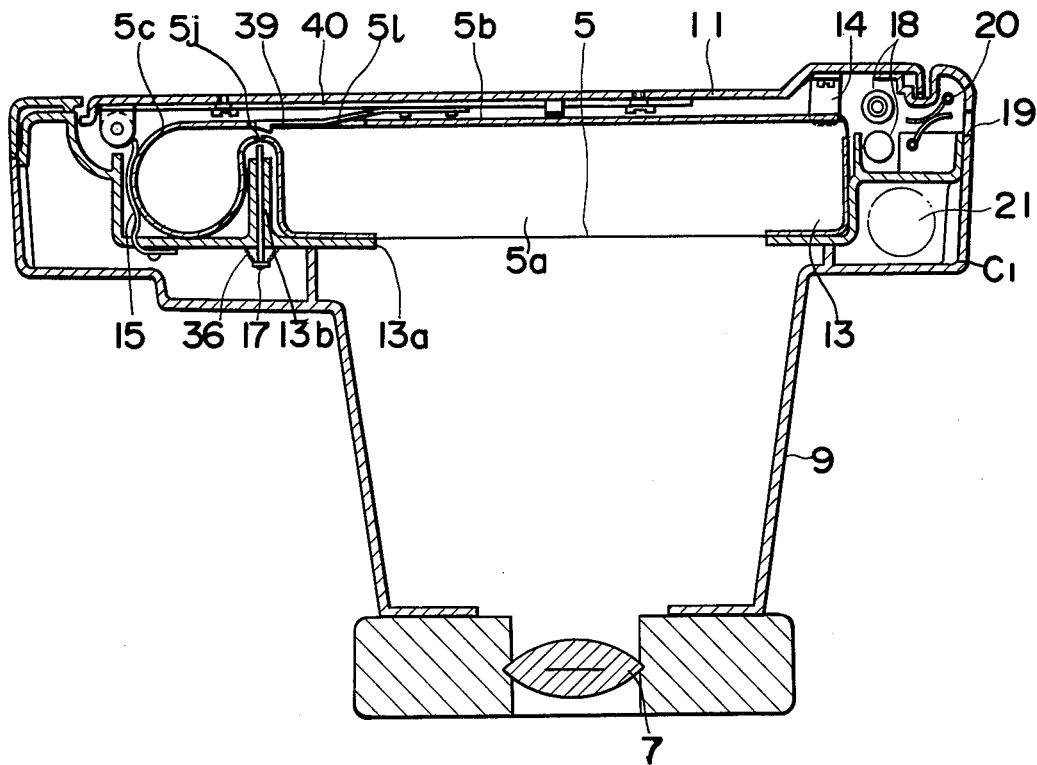
Figure 13:
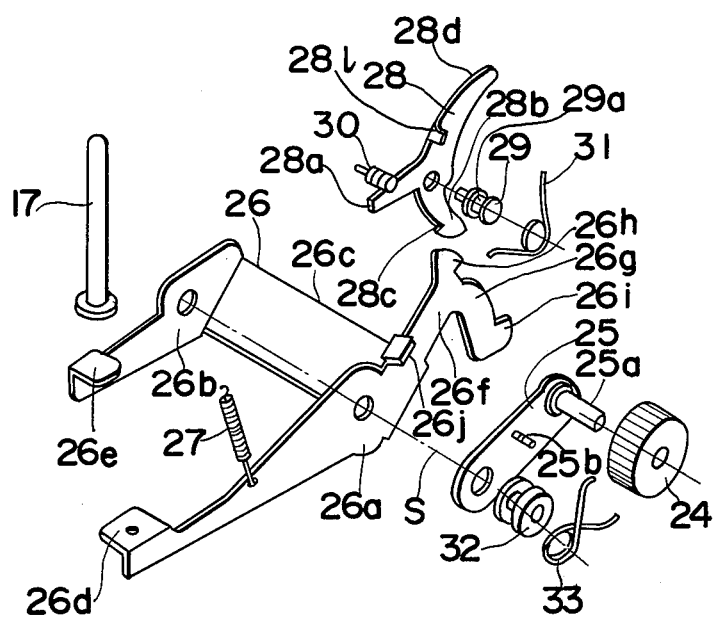
Figure 16:
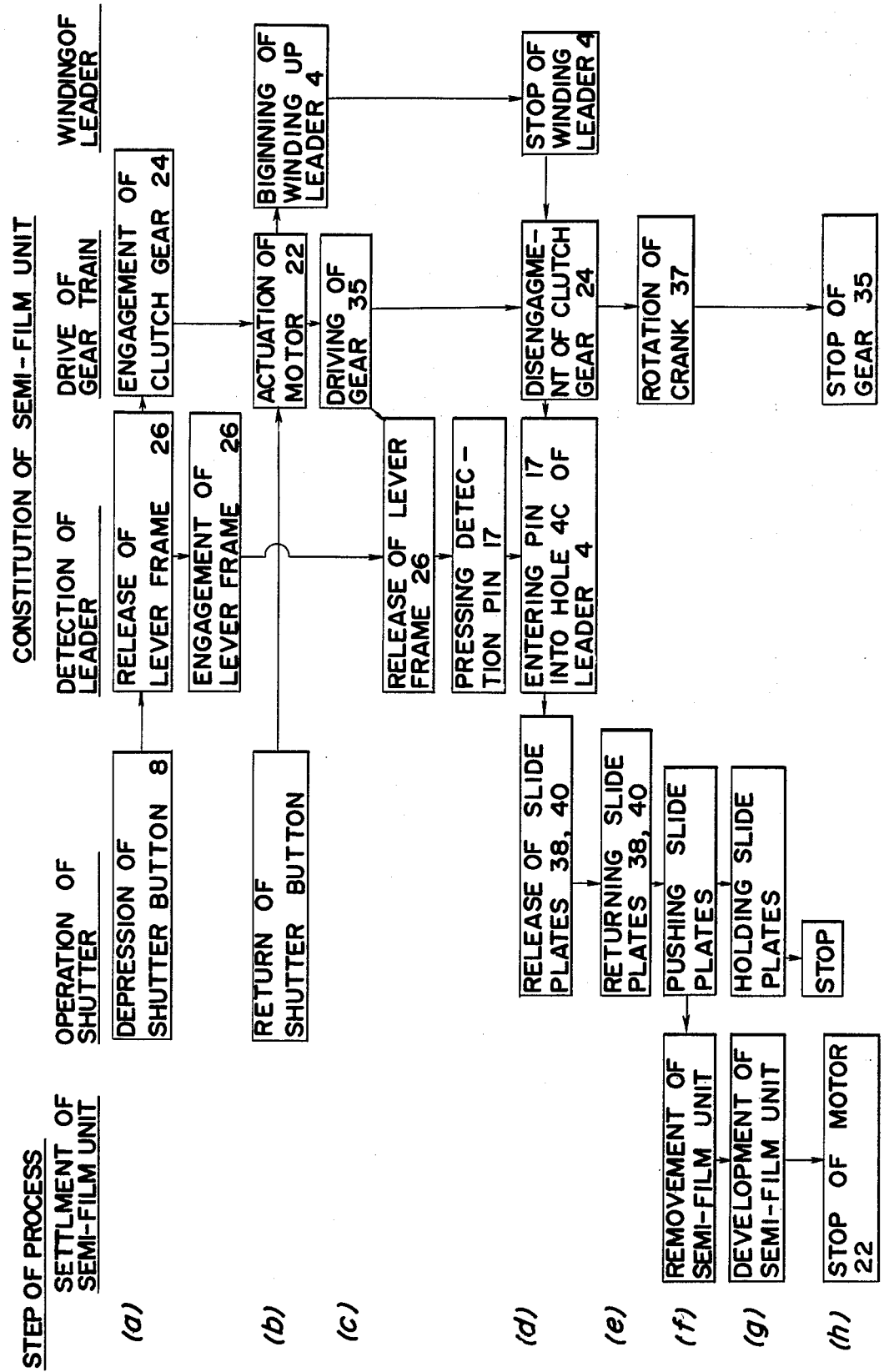
Figure 20:
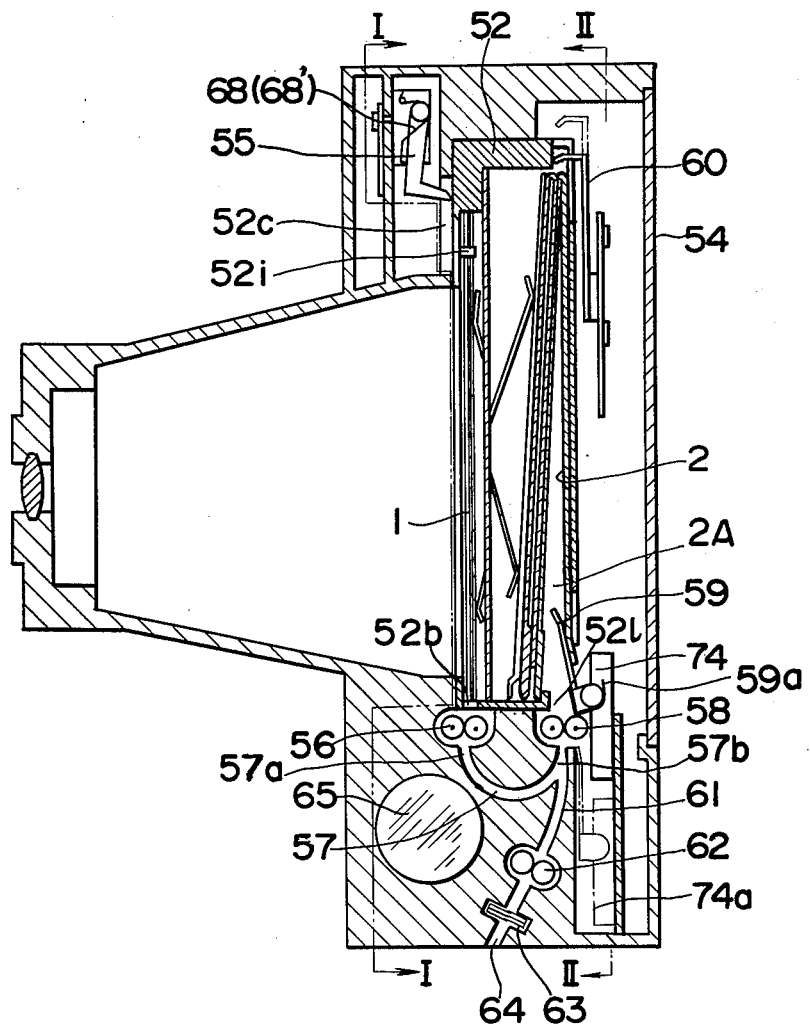
Figure 24:
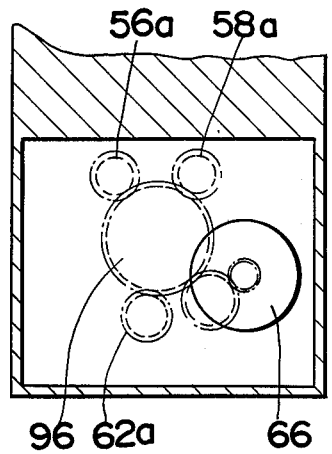
Figure 21:
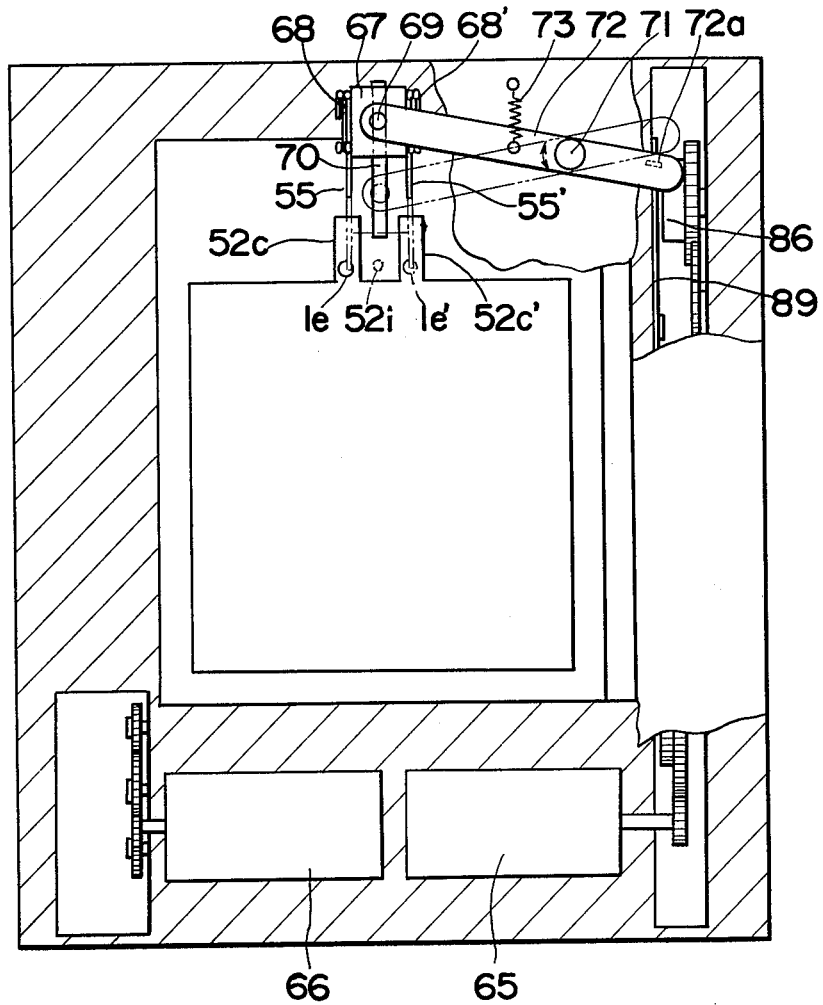
Figure 22:
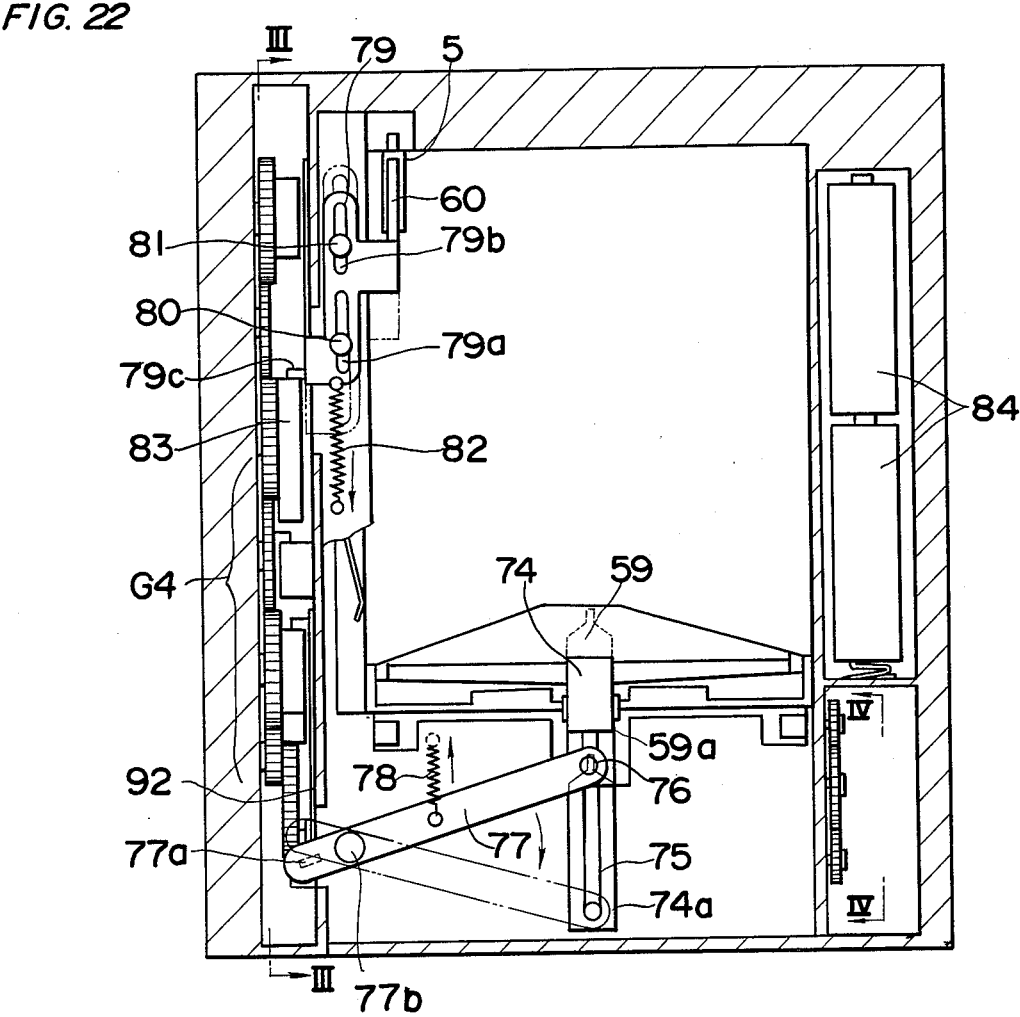
Figure 26:
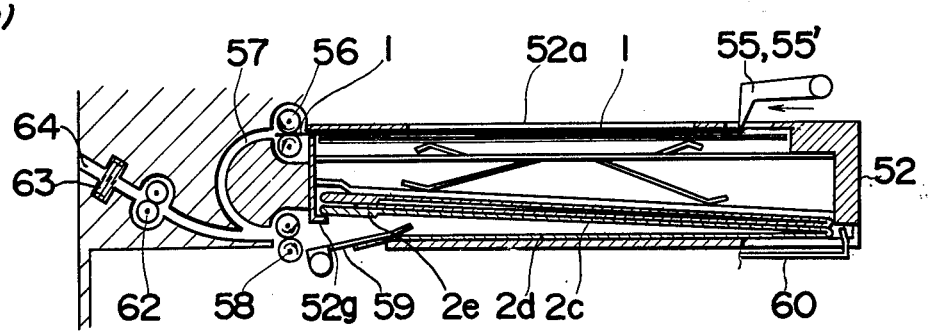
Figure 23:
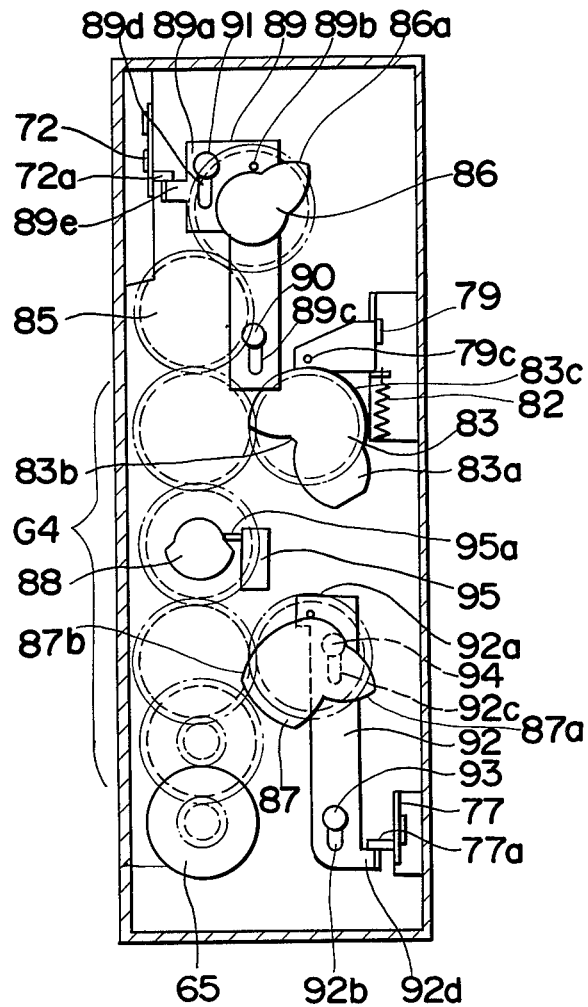
Figure 29:
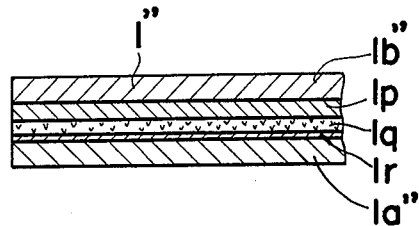
Figure 30:
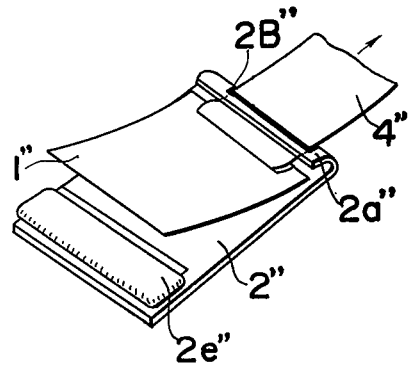
Figure 26:
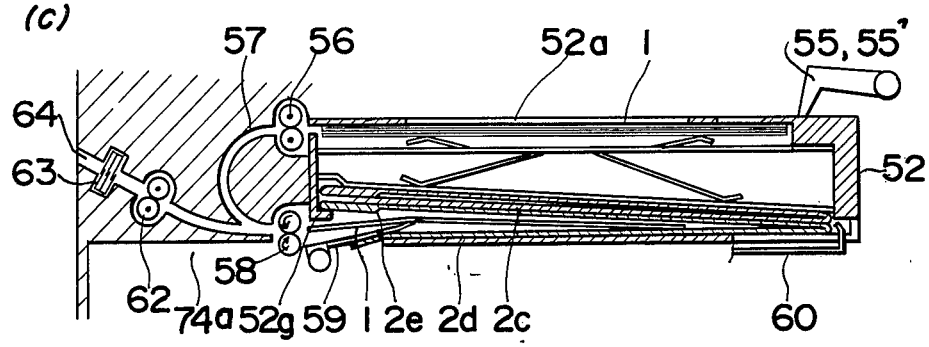
Figure 25:
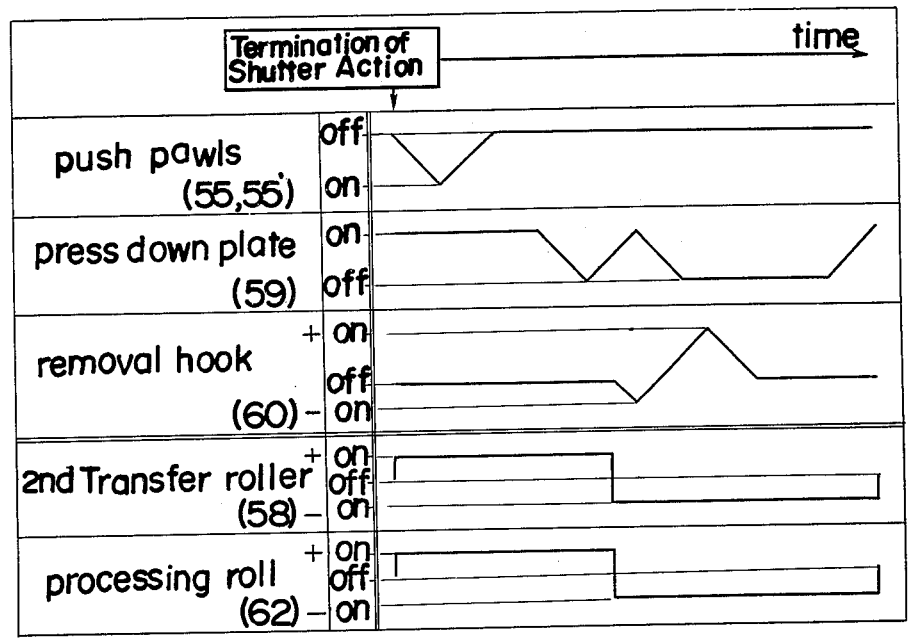
Figure 26:
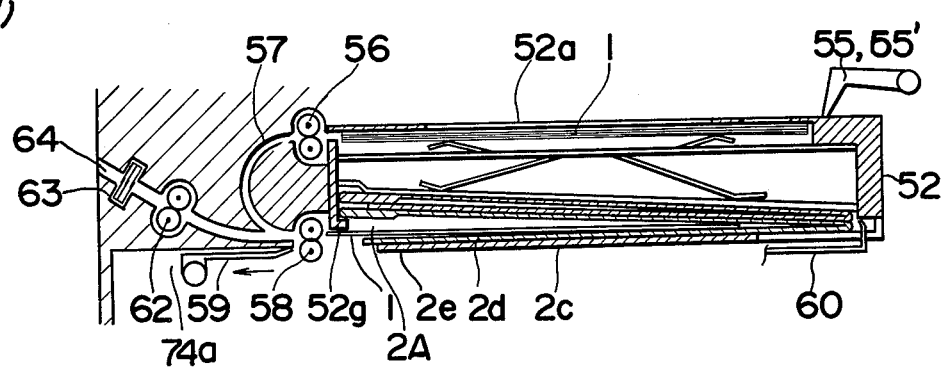
Figure 26:
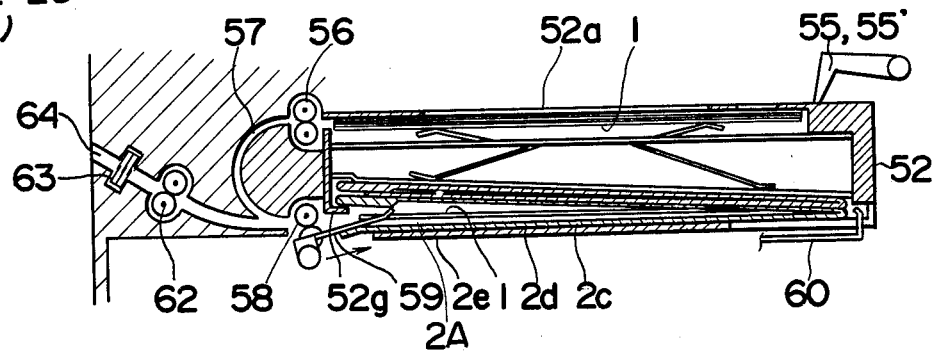

FIGS. 7(a) to (d) are explanatory drawings illustrating transfer by leader of an exposed first sheet into association with a corresponding second sheet in accordance with the first embodiment of the invention;

FIG. 8 is a front perspective view, at a small size, of a camera according to a first embodiment of the invention;

FIG. 9 is a rear perspective view of the camera of FIG. 8;

FIG. 10 is a vertical cross-sectional view, on an enlarged scale, of the camera of FIG. 8;

FIGS. 11 and 12 are respectively plane and cross-sectional views of a drive transmission system in the camera of FIG. 8;

FIG. 13 is a disassembly perspective view of a leader wind-up detection and control means in the camera of FIG. 8;

FIG. 14 is a perspective view of a film unit removal means in the camera of FIG. 8;

FIG. 15 shows the means of FIG. 14 in a disassembled state;

FIG. 16 is a flowchart of the actions of the means of FIGS. 8 through 15;

FIGS. 17, 18 and 19 are respectively front perspective, rear perspective, and cross-sectional views of a film pack associable with the second embodiment of the invention;

FIG. 20 is a vertical cross-sectional view of a camera according to the second embodiment of the invention showing a pack loaded therein;

FIG. 21 is a cross-sectional view taken through the line I—I of FIG. 20, and showing a first sheet transfer means;

FIG. 22 is a cross-sectional view taken through the line II—II of FIG. 20 and shows a first sheet insertion and semi-film unit removal means;

FIG. 23 is a cross-sectional view taken through the line III—III of FIG. 22, and shows the drive transmission system for the means shown in FIGS. 20 through 22;

FIG. 24 is a cross-sectional view taken through the line IV—IV of FIG. 22 and shows gears for transmission of drive to processing and transfer rolls in the camera of FIG. 20;

FIG. 25 is a timing chart of the actions of the means shown in FIGS. 20 through 24;

FIGS. 26(a) to (h) are explanatory drawings in illustration of transfer of an exposed first sheet into a second sheet to form a complete film unit, and subsequent removal of the film unit;

FIGS. 27 and 28 are respectively perspective and cross-sectional views of a semi-film unit in accordance with a third embodiment of the invention; and FIGS. 29 and 30 are respectively enlarged cross-sectional and perspective views of the first sheet of a semi-film unit in accordance with a fourth embodiment of the invention.

DESCRIPTION OF THE PREFERRED EMBODIMENTS

Referring first to FIG. 1, there is shown the basic structure of a semi-film unit which is associable with a camera of the invention and which is constituted by a first sheet 1 and a second sheet 2, which are held separate from one another prior to production of a complete film unit, i.e., a photograph. The first sheet 1 may comprise a plurality of layers, at least one of which is a photosensitive layer which is exposable to produce a negative image of an object. One edge of the first sheet 1 is constituted by a strip 1c, which is made of a comparatively stiff material, and in a generally central portion of which there is formed a bayed notch 1d, through which a holder pin 5i of a pack 5, described below, may pass to aid positioning of the first sheet 1 in the pack 5. In a first sheet 1 for use in association with one embodiment of the invention, which is described later, on one or both sides of the notch 1d there is formed a hole 1e, which is engageable by a removal means provided in the camera. The second sheet 2 is made of a demensionally stable material, and has almost the same general dimensions as, or is slightly larger than the first sheet 1, whereby the second sheet 2 may provide a cover for the first sheet 1.

Figure 2:
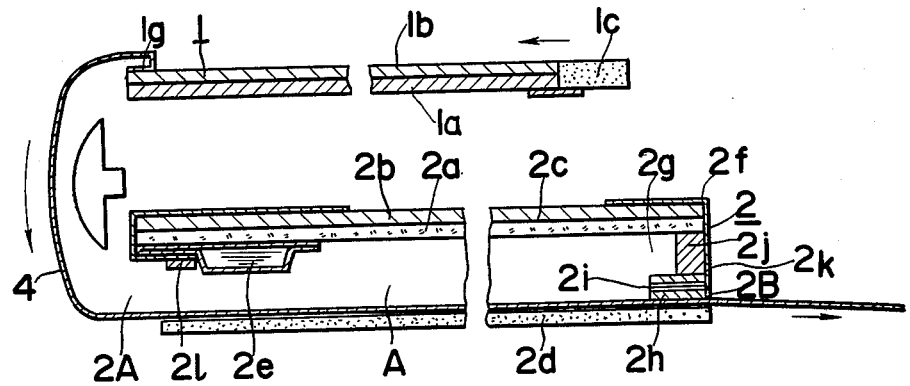
Figure 2:
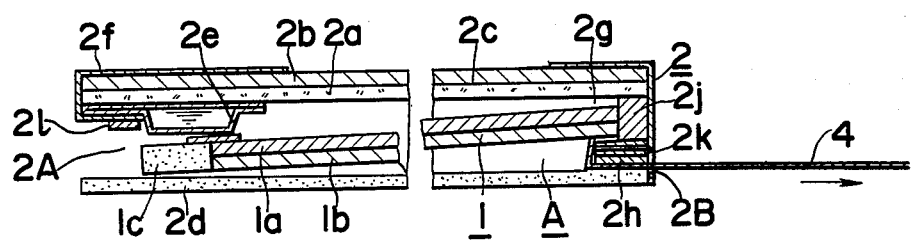
Figure 2:
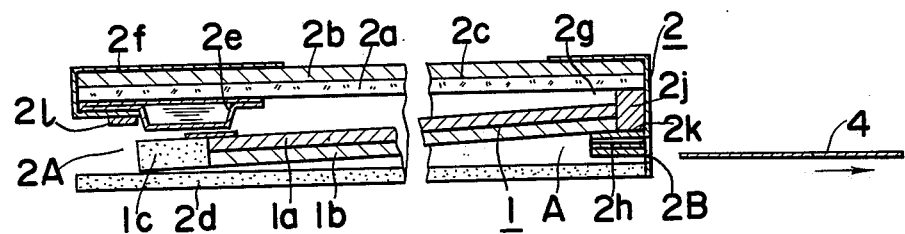
Figure 2:
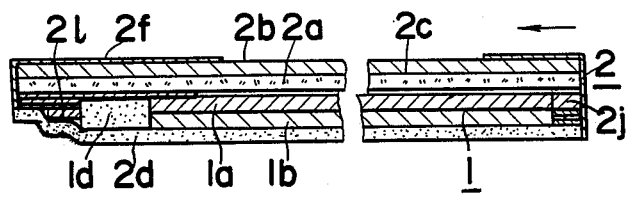

FIG. 2 shows in greater detail a semi-film unit employable in association with a camera C1 according to a first embodiment of the invention. In this film unit, the first sheet 1 is constituted by a negative image layer 1a, which is supported on a transparent support layer 1b, the support layer 1b being on the forward side of the negative image layer 1a when the first sheet 1 is initially loaded in the camera C1. Throughout the description "forward" and "rearward" relate to direction the camera and the film face when taking a picture. The negative image layer 1a includes a photosensitive silver halide layer, and a hydrophilic colloid sub-layer that is sufficiently absorptive of light to prevent other first sheets 1', 1", etc., which are loaded in the camera C1 behind this first sheet 1, from being partially exposed or becoming blurred upon exposure of this first sheet 1. The layers 1a and 1b are both affixed along one edge to the stiff strip 1c. The first sheet 1 is transferable to a second sheet 2 by a leader 4, which is attached to the edge 1g thereof opposite to the stiff strip 1c and is formed of the configuration having a width smaller than the first sheet 1. On the rear side of the first sheet 1, at the junction of the negative image layer 1a and the strip 1c, there is provided a slat 1e, which is made of a comparatively strong, rigid material, and which, when the first sheet 1 is moved into contact with a second sheet 2, in a manner described below, is brought against a processing solution pod 2e provided in the second sheet 2.

Still referring to FIG. 2, the corresponding second sheet 2 comprises a positive image layer 2a, which has a composition permitting formation therein of a photoimage by diffusion-transfer process, and which is coated on the rear side of a transparent support layer 2b, the image layer 2a and support layer 2b together constituting a main second sheet 2c, the support layer 2b being on the forward side of the main second sheet 2c. The main second sheet 2c is associated with, but slightly separated from, a subsidiary second sheet 2d, which is lightproof and lies to the rear of the main second sheet 2c, the subsidiary second sheet 2d and main second sheet 2c being separated by a space A sufficient to permit insertion of the first sheet 1 therebetween. The subsidiary second sheet 2d is in attachment to the main second sheet 2c along one edge only (the right-hand edge in the drawing), or along three edges, whereby the second sheet 2d as a whole constitutes a folder or envelope for containment of the first sheet 1, in either case the left-hand edge of the lightproof subsidiary second sheet 2d being unattached to that of the main second sheet 2c, whereby there is formed an insertion opening 2A. Over the left-hand and right-hand front edges of the main second sheet 2 there are provided angle pieces 2f, which impart suitable rigidity to the main second sheet 2c. Along the rear side of the left-hand edge of the image layer 2a there is affixed a bonding strip 2l. The bonding strip 2l comprises, for example, micro-capsules which contain adhesive, and which, after the first sheet 1 has been inserted in the second sheet 2, are broken open by pressure means provided in the camera C1, whereby the first sheet 1 is sealed in the second sheet 2, as described in greater detail below. If the main second sheet and subsidiary second sheet 2d are initially attached along one edge only, bonding strips may be similarly provided along the other unattached edges. Adjacent to the bonding strip 2l, and also attached to the rear side of the positive image layer 2a, there is provided a pod 2e which holds a processing solution and is breakable by the pressure means of the camera C1, whereby the processing solution may be extruded therefrom.

The opposite end of the second sheet 2, which is shown as the right-hand end in the drawing, forms a closed end 2k. Inside this closed end 2k, and attached to the rear side of the right-hand end of the image layer 2a and to the inside of the right-hand angle piece 2f, there is provided an absorbent block 2j, which serves to absorb excess processing solution which is extruded from the pod 2e but not used in processing of a film unit. Extending inwards from the right-hand angle piece 2f and in attachment to the rear side of the absorbent block 2j, there is a support piece 2i, which is embedded in and/or supports a bonding strip 2h having a construction and composition similar to that of the bonding strip 2l. The support piece 2i and bonding strip 2h extend further inwards, i.e. leftwards, than the absorbent block 2j, whereby in the front corner of the second sheet closed end 2k there is defined a small compartment 2g. The rear side of the bonding strip 2h is slightly separated from the front side of the subsidiary second sheet 2d, thereby defining a slit 2B, which is wide enough to permit passage of a leader 4 only but not wide enough to permit passage of a sheet 1, thereby the slit 2B defines a means for separating a connecting member from a first sheet 1, and is eventually sealable by the bonding strip 2h.

Still referring to FIG. 2(a), prior to a photograph being taken, the first sheet 1 is in a forward part of a pack, in line with the optical axis of the lens system of the camera C1, and separate from the second sheet 2, which is in a rear portion of the pack. The leader 4 extends rearwards from the first sheet right-hand edge 1g, is turned through 180°, and is led into the second sheet 2, through the opening 2A thereof, passed between the main second sheet 2c and subsidiary second sheet 2d, and then out through the slit 2B, the other end of the leader 4 being attached to a suitable wind-up means. The end of the leader 4 in attachment to the first sheet edge 1g is not in flat attachment thereto, but is doubled back and only then attached to the front side of the first sheet edge 1g, whereby, when permitted, this end of the leader 4 tends to stand slightly clear of the first sheet 1.

In reference to FIGS. 2(b) – (d), assembly of the first sheet 1 and second sheet 2 to form a semi-film unit is effected by means which are provided in the camera C1 described below, and in general outline is as follows.

In FIG. 2(b), upon actuation of the camera shutter means light is directed by the camera lens system through the first sheet transparent layer 1b to expose and form an image in the negative image layer 1a, and in succession the leader wind-up means is actuated, whereby the exposed first sheet 1 is drawn from its forward position, turned through 180°, and then moved through the second sheet opening 2A and into the envelope constituted by the second sheet 2, the leader 4 being drawn through the slit 2B and out of the second sheet 2 envelope during this time. Since the end of the leader 4 attached to the first sheet 1 is doubled and tends to stand clear from the first sheet 1, as the leader 4 is drawn out through the slit 2B and pulls the first sheet 1 into the second sheet 2, the main portion of the leader 4 stays generally flat on the front side of the subsidiary second sheet 2d, and the doubled end of the leader 4 pushes the leader attachment edge 1g of the first sheet 1 slightly forwards, whereby the first sheet edge 1g is moved into the small compartment 2g at the forward side of the closed end 2k of the second sheet 2. At this time, the slat 1e, which was originally at the rear side of the first sheet 1 and is now at the front side thereof since the first sheet 1 has been turned through 180°, is brought into contact with the processing solution pod 2e.

In FIG. 2(c), the leader 4 continues to be wound up, whereby, since the first sheet 1 is blocked with the edge 1g thereof in the compartment 2g, the leader 4 is pulled out of attachment with the first sheet 1, which is therefore left together with the second sheet 2 to form a semi-film unit ready for processing.

In FIG. 2(d), this film unit is then passed through processing rolls, or similar means, which press the main second sheet 2c, subsidiary second sheet 2d and first sheet 1 together, due to which action the rigid slat 1e of the first sheet 1 presses against and breaks the pod 2e, from which processing solution is thereupon extruded and spread through the film unit, thereby causing development of the image in the negative image layer 1a, and diffusion through the light-absorbent sub-layer of the negative image layer 1a, and production of a corresponding image in the positive image layer 2a of the second sheet 2, and at the same time adhesive is extruded from the micro-capsules, or similar elements, of the bonding strips 2l and 2h, which therefore seal the opening 2A and slit 2B, respectively. The processing rolls also forward the film unit out of the camera, there thus being made available to a photographer a complete film unit which is dry, since excess processing solution has been absorbed by the absorbent block 2j, and includes a positive copy of a photograph formed on the second sheet positive image layer 2a and viewable through the transparent layer 2b, and a negative, from which further copies of the same photograph may be obtained, and which is protected between the lightproof subsidiary second sheet 2d and the light-absorbent sub-layer of the first sheet negative image layer 1a.

Figure 3:
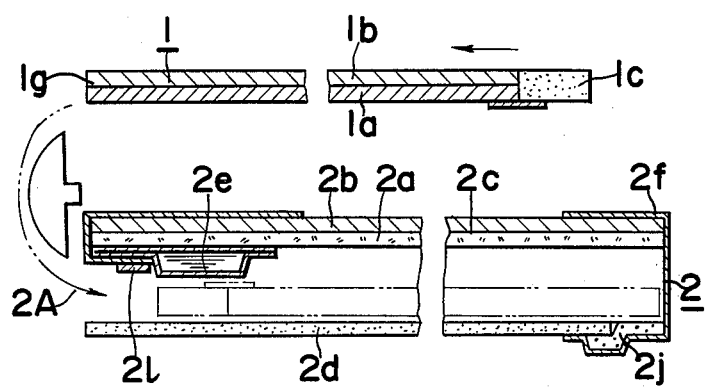
Figure 3:
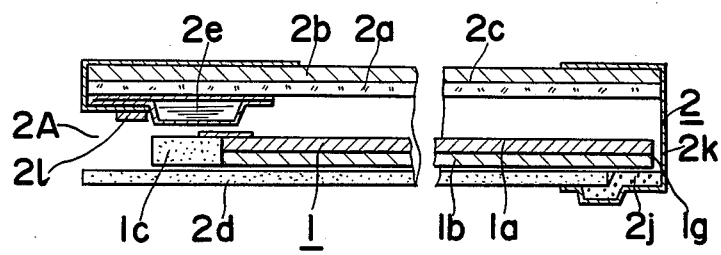
Figure 3:
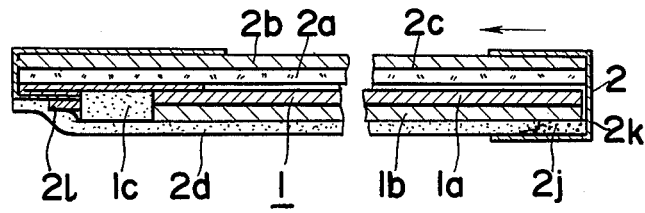

FIG. 3(a) shows a semi-film unit employable in a camera C2 according to a second embodiment of the invention. The first sheet 1 of this film unit is constituted by a photosensitive layer 1a coated on the front side of a support layer 1b, which contains a substance absorptive of light and permeable to processing solution other first sheet elements being the same as described in reference to FIG. 2. The corresponding second sheet 2 is the same as that of a film unit employable in association with the first embodiment of the invention, except that it does not comprise a leader slit 2B, the right-hand end thereof being completely sealed by an angle piece 2f, which covers the right-hand edge not only of the main second sheet 2c but also of the subsidiary second sheet 2d, and which also defines a compartment for containment of an absorbent block 2j to the rear of right-hand end of the subsidiary second sheet 2d. Also, there being no slit 2B in this film unit, there is, of course, no need for a bonding strip 2h or support piece therefor. With this film unit the first sheet 1 is not attached to a leader and is transferred into the second sheet 2 only by means provided in the camera C2. These means, which are described in detail later, function in a timed sequence, the general outline of the action being as follows.

Referring to FIG. 3(b), after being exposed, the first sheet is moved from its forward position, turned through 180°, and then moved into the envelope constituted by the second sheet 2 a sufficient distance for the edge 1g thereof to have been brought into contact with or very near to the inside of the second sheet closed end 2k, and for the rigid slat 1e thereof to have been brought into contact with or in line with the processing solution pod 2e, whereby there is constituted a semi-film unit ready for processing.

Referring to FIG. 3(c), this film unit is then passed through processing rolls or similar means which, while forwarding the film unit out of the camera, cause the bonding strip 21 to seal the second sheet opening 2A, the first sheet slat 1e to break open the processing solution pod 2e, and processing solution to be spread through the film unit, whereby there is obtained a dry copy including an immediately viewable positive, and a protected negative, as described above.

Figure 4:
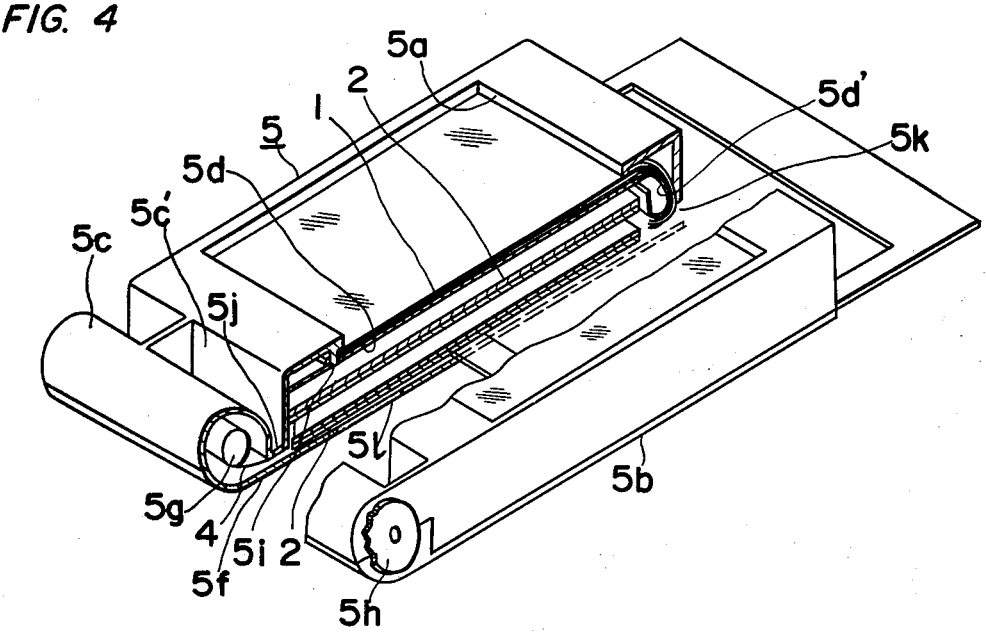
FIG. 4 is a perspective view, partly in section, of a pack holding semi-film units associable with a first embodiment of the invention.
Figure 5:
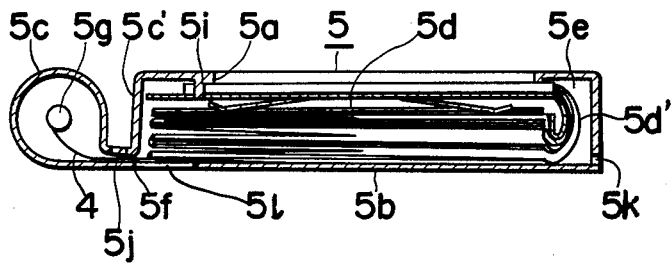
FIG. 5 is a longitudinal cross-sectional view of the pack of FIG. 4.

Referring now to FIGS. 4 and 5, semi-film units associable with the camera C1, are initially provided in a pack 5, which is loadable in the camera C1, the first sheets 1 and an equal number of second sheets 2 being provided separately, and out of contact with one another, in the forward and rear portions, respectively of the pack 5, between which a pertition spring plate 5d is provided to separate with each other. The first sheets 1 lie in line with a large opening 5a, which is formed in the front wall of the pack 5, and exactly frames the photosensitive layer of the foremost first sheet 1, and through which the foremost sheet 1 may be exposed correctly to light directed through the lens of the camera C1. In this configuration, the abovementioned pin 5i, which extends rearwards from the front wall of the pack 5, projects through the bayed notches 1d of the first sheets 1 (FIG. 1), and helps to maintain the first sheets 1 in correct alignment. However, with the application of a slight force, a first sheet 1 can be moved sideways out of engagement with the pin 5i, the narrow opening of the bayed notch being forced slightly wider and past the pin 5i. The first sheets 1 and second sheets 2 are pressed forwards and rearwards respectively by a single spring plate 5d, which is provided therebetween. Successive first sheets 1 may be drawn into successive second sheets 2 by leaders 4, which are passed round a guide 5d' in the form of a semi-circular bar extended from the end of the spring plate 5d and provided in a transfer portion 5e formed at one end of the pack 5. At the other end of the pack 5, there is formed a drum portion 5c, which forms a housing for a leader wind-up reel 5g, and for leaders 4 wound up thereby, and which is set off slightly from the main portion of the pack 5, being separated therefrom by a recess 5c'. Leaders 4 may pass from the main portion of the pack 5 into the drum portion 5c via a slit 5f which is formed between the pack rear wall 5b and the rear end of the wall defining the recess 5c'.

In FIG. 4, the wind-up reel 5g connects to and is rotatable together with a gear 5h, which is mounted on the outside of the pack 5, and is engageable by a drive means provided in the camera C1, whereby leaders 4 may be wound onto the reel 5g.

In FIG. 5, the rearmost second sheet 2, which subsequently forms an independent semi-film unit together with the foremost first sheet 1, lies against the pack rear wall 5b, in line with the leader slit 5f, and is also in line with a removal slot 5k, which is formed at the other end of the pack 5, and which is wide enough to permit removal of the film unit constituted by a first sheet 1 and a second sheet 2 from the pack 5. As described in further detail later, this removal is effected by a hook means which is provided in the camera C1, and extends through a slot 51 formed in the pack rear wall 5b, near the leader slit 5f, (to the right thereof in the drawing).

Figure 6:
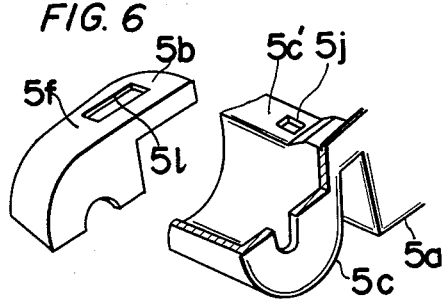
FIG. 6 is a detail view showing location of a leader detection pin hole in the pack of FIG. 4.

As shown in the detail drawing of FIG. 6, a small opening 5j is formed in the wall at the bottom of the recess 5c', and communicates with the leader slit 5f. This opening 5j permits entry of a detection pin, described later, into the pack 5, in order to engage a detection hole 4c, which is formed near the attachment end of each leader 4 associated with a first sheet 1.

Figure 7:
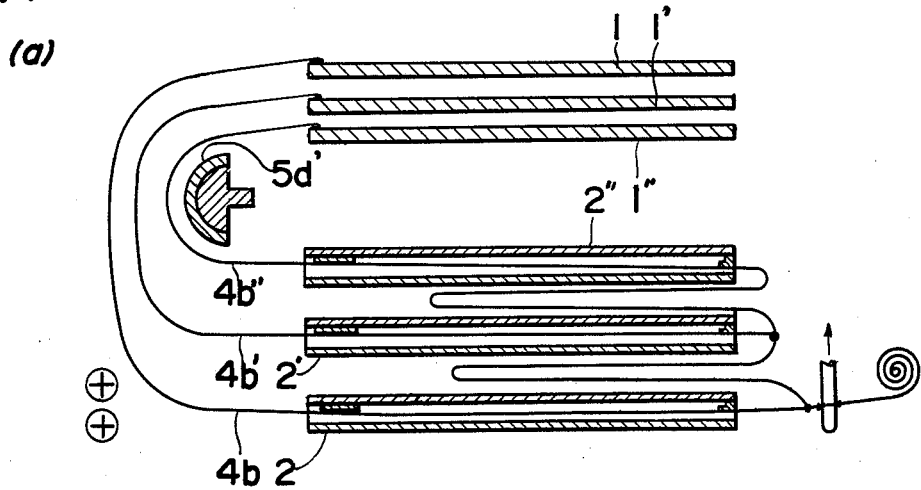

Reference is now had to FIG. 7, which shows schematically construction and attachment of leaders 4 for transferring exposed first sheets 1 into corresponding second sheets 2, and also illustrates leader 4 action which was partially described earlier in reference to FIG. 2. For the purposes of simplicity, the drawing shows only three semi-film units comprising first sheets 1, 1', and 1" in attachment to leaders 4, 4', and 4", respectively, and transferrable into corresponding second sheets 2, 2', and 2", it being understood, of course, that there may be a greater number of semi-film units, and that leader 4 action is the same in all cases.

In FIG. 7(a), the leader 4 is attached at one end to the edge 1g of the foremost first sheet 1, passes therefrom around the guide 5d", into the opening 2A of the rearmost second sheet 2, which is to subsequently constitute a semi-film unit together with the first sheet 1, and is passed through the second sheet 2 and then out through the leader slit 2B at the other end thereof. The other leaders 4' and 4" are similarly disposed with respect to the first sheets 1' and 1" and second sheets 2' and 2", respectively. The end of the leader 4 exterior to the envelope constituted by the second sheet 2 and further removed from the first sheet 1 (i.e., the leader 4 right-hand end in the drawing) is connected to the corresponding end of the leader 4' associated with the next film unit by a slack portion 4a, which is fixedly attached at opposite ends to the leaders 4 and 4'. The leaders 4' and 4" are similarly connected by another slack portion 4a'. The leader 4 also connects to an extension 4b, which connects to the wind-up reel 5g. The length of the slack portion 4a is such that the leader 4 can be wound up almost entirely on the reel 5g and to out of contact with the second sheet 2 without tension being imparted to the next leader 4'. The slack portion 4a' similarly permits almost complete wind-up of the next leader 4' without tension being imparted to the leader 4". The abovementioned detection hole 4c is formed in the slack portion 4c, near the point of attachment thereof to the leader 4, there being another detection hole 4c' similarly located in the next slack portions 4a'.

In FIG. 7(c), when the reel 5g is rotated, the extension 4b is taken up thereon, and then the leader 4 and slack portion 4a are together wound onto the reel 5g, the leader 4 being drawn through the slit 2B of the second sheet 2, and drawing the first sheet 1 from its foremost position, through a U-turn, and into the second sheet 2 via the second sheet opening 2A, and the leader 4 and slack portion 4a being together drawn through the leader slit 5f of the pack 5 containing the film units, as shown in FIG. 5, to the reel 5g. At this time the spring plate 5d in th pack 5 moves the other first sheets 1' and 1" forwards, whereby the next first sheet 1' is brought to a foremost position ready for exposure. The strength of the bond between the leader 4 and the first sheet 1 is only sufficient to permit the leader 4 to draw the first sheet 1 into the second sheet 2 until the leader attachment edge 1g of the first sheet has been brought into the compartment 2g, as described hereinbefore with FIG. 2, after which continued rotation of the reel 5g causes the leader 4 to be detached from the first sheet 1 and to be drawn completely through the slit 2B and out of contact with the second sheet 2. Soon after the leader 4 is moved out of contact with the second sheet 2, the detection hole 4c' in the slack portion 4a comes into line with the small opening 5j communicating with the leader slit 5f as shown in FIG. 6, and is engaged by a detection means, described below, which causes rotation of the reel 5g and hence leader wind-up to be stopped. The first sheet 1 and second sheet 2 thus constitute an independent semi-film unit (1, 2), while the leader 4' of the next film unit is still connected to the reel 5g by the slack portion 4a.

In FIG. 7(d), next, the film unit (1, 2) constituted by the first sheet 1 and the second sheet 2 is moved out of the pack 5, in the direction indicated by the block arrow in the drawing, and into engagement with rolls or similar means, which cause processing of the film unit (1, 2) and forwarding thereof to the exterior of the camera. At this time, the spring means 5d moves the remaining second sheets 2' and 2" rearwards, the second sheet 2' being brought to a rearmost position ready for reception of the now foremost first sheet 1', after exposure thereof, the abovedescribed action being repeated for each successive photograph taken.

Reference is now had to FIGS. 8 and 9 which show the general external appearance of the camera C1, which comprises a lens mount portion and a main portion 10. The lens mount portion 9 carries a lens 7, through which light to expose a foremost first sheet 1 is directed, and a suitable shutter means actuated by a shutter button 8. The main portion 10 carries a viewfinder and other conventional elements, and provides accommodation for a film pack 5. The pack 5 is loaded into the camera C1 through the rear of the main portion 10, which is closeable by a cover 11. The rear cover 11 is held closed by manually adjustable screw knobs 12.

Referring now to FIG. 10, when the pack 5 is loaded in the camera C1 and the camera rear cover 11 is closed, the front of the pack 5 lies against a camera internal wall 13, which is parallel with the closed cover 11, and comprises an opening 13a which matches and is in line with the pack front opening 5a, whereby a foremost first sheet 1 in the pack 5 may be exposed to light directed through the camera lens 7. The pack 5 is maintained in a correct position by a spring plate 14, which is mounted on the rear cover 11, and presses the pack 5 forwards, and by another spring plate 15, which is mounted on, and extends rearwards from, the internal wall 13, contacts the leader wind-up drum portion 5c of the pack 5, and presses the pack 5 towards the lower end of the camera C1. A rearwardly extending short wall 13b extends at right-angles from an upper portion of the internal wall 13 and into the recess 5c' formed between the wind-up drum portion and the main portion of the pack 5. A detection pin 17 which may engage the detection hole 4c of a leader 4, is slidably mounted in, and may extend completely through an opening formed in the short wall 13a, and lies in line with the small opening 5j as shown in FIG. 6, which communicates with the leader slit 5f of the pack 5. A spring 36, which is mounted on the camera internal wall 13, and is in fixed attachment to the forward end of the pin 17, exerts a constant force urging the pin 17 away from the small opening 5j. The forward end of the detection pin 17 also connects, either directly or through a suitable extension or linkage means to a cam or crank wheel, not shown, which controls action of a retention means for a film unit removal means in response to movement of the pin 17, as described in further detail later. A film unit extractor arm 39, which is carried on a slide plate 40 described below, extends into the slot 51 formed in the top rear of the pack 5. The film unit removal slot 5k of the pack 5 lies in line with a pair of processing rolls 18 provided in a lower part of the camera main portion 10, and with a removal passage leading to an extraction slot 19 formed in the camera bottom wall. The processing rolls 18 are rotated when drive is supplied thereto from a motor 22 provided in a lower part of the camera C1, the motor 22 also supplying requisite drive to other moving elements of the camera C1, and being actuated upon termination of shutter action to take a photograph and kept actuated a certain time thereafter by a conventionally known means. Between the processing rolls 18 and the extraction slot 19 there is provided a pair of oppositely curved spring plates 20. Each spring plate 20 possesses a spring force urging it towards the other spring plate, whereby the spring plates 20 normally contact one another and prevent entry of light via the extraction slot 19 to the location of the loaded pack 5. However, upon extraction of a film unit (1, 2) from the pack 5 in a manner described below, the spring plates 20 may be moved apart by the film unit (1, 2), to permit advance thereof to the extraction slot 19.

In reference now to FIGS. 11 and 12, drive from the motor 22 is supplied directly to a small diameter gear 21, which is fixedly mounted on the motor 22 output shaft. The small gear 21 transmits motor drive to the processing rolls 18 via a gear train G1, and also drives a rotary crank 37, near the outer end of which there is fixedly attached a crank pin 37a. During part of the rotation of the crank 37, the pin 37a thereof contacts and actuates a slide plate 38, as shown in FIG. 15, to effect removal of a film unit (1, 2), as described in greater detail later. Fixedly mounted on the same rotary shaft as the crank 37 there is a gear which is part of a gear train G2, via which motor drive is supplied to a gear 35. The gear 35 may engage and drive a clutch gear 24, by which motor drive may be transmitted, via a gear 34 and a gear train G3, to a wind-up gear 23. The wind-up gear 23 engages the above-mentioned reel drive gear 5h of the pack 5 shown in FIG. 4, whereby rotation of the gear 23 causes a leader 4 and slack portion 4a associated therewith to be wound onto the reel 5g in the pack drum portion 5c. The clutch gear 24 is rotatably mounted on the end of an arm 25, as shown in FIG. 13, which is in spring-loaded attachment to a pivotally mounted lever frame 26. The lever frame 26 may contact the forward end of the detection pin 17 and is in connection with a spring 27, which exerts a constant force tending to pivot the lever frame 26 clockwise in the drawing, and cause the lever frame 26 to push the pin 17 towards the pack 5, and into the small opening 5j of the pack 5. When the camera shutter is actuated, the lever frame 26 is pivoted anticlockwise by a conventional means in a known manner, and out of contact with the pin 17, at which time the spring 36 is unopposed to move the pin 17 away from the pack 5. When the lever frame 26 is thus swung anticlockwise, one end thereof is engaged by one arm of a pivotally mounted lever 28, which thus prevents return, clockwise movement of the lever frame 26. This restraint on clockwise movement of the lever frame 26 may be removed by the action of a pin 35a, which is fixed to and projects from a point near the periphery of the upper surface of the gear 35, and which, as the gear 35 rotates, is brought into contact with another arm of the pivotal holding lever 28, and swings the holding lever 28 anticlockwise, and out of engagement with the lever frame 26.

The gear support arm 25, lever frame 26, and holding lever 28 are shown in greater detail in FIG. 13, to which reference is now had. The lever frame 26 is an integral unit comprising horizontal lever arms 26a and 26b, which are joined by a cross-piece 26c, and which are rotatably mounted on a single fixed shaft not shown, and extend in the same direction therefrom to leftwards in the drawing, clockwise or anticlockwise rotation of the lever arm 26a thus being accompanied by clockwise or anticlockwise rotation of the arm 26b. Another horizontal arm 26f forms a rightward extension of the arm 26a, leading from the pivotal point thereof. One end of the spring 27 is attached to a central point of the lever arm 26a, and the other end thereof is attached to a fixed portion of the camera C1, the spring 27 acting to pivot the lever frame 26 clockwise, as noted earlier. The outer, left-hand end of the lever arm 26a forms a small plate extension 26d, which connects to the camera shutter mechanism through a suitable means not shown, which, when the camera shutter is actuated, pushed the plate 26d and causes the lever frame 26 to pivot anticlockwise, counter to the force of the spring 27. At the outer, left-hand end of the lever arm 26b there is formed a small contact plate 26e, which extends at approximately right-angles to the arm 26b, and may contact the outer, i.e., forward end of the detection pin 17. When the lever frame 26 is swung anticlockwise, the contact plate 26e is moved out of contact with the pin 17. When the spring 27 is unopposed, and the lever frame 26 is swung clockwise thereby, the contact plate 26e pushes the pin 17 towards the pack 5, counter to the force of the spring 36 as shown in FIG. 10.

Still referring to FIG. 13, in integral attachment to a generally central portion of one edge of the lever arm 26f there is formed a spring holder projection 26j, which is contacted by one end of a wire spring 33, whose function is described below. The outer, right-hand end of the lever are 26f is in integral connection with a holder portion 26g, the upper and lower ends of which form hooks 26h and 26i, respectively. Upon anticlockwise rotation of the lever frame 26, the hook 26i is brought into contact with a stop stud not shown, which is fixedly attached to a wall portion of the camera C1, and prevents the lever frame 26 from swinging clockwise more than a certain amount when the camera shutter is actuated. The other hook 26h is engageable by the holding lever 28, which comprises a straight arm 28a and two curved arms 28b and 28d. The end of the curved arm 28b forms a detent portion 28c, which may engage the hook 26h of the lever frame 26. Projecting from the other curved arm 28d there is a small spring contact plate 28e. The holding lever 28 is pivotally mounted on a fixed shaft 29, on one end of which there is fixedly attached a mounting collar 29a. A wire spring 31 is mounted on the collar 29a, one end thereof contacts the contact plate 28e on the lever arm 28d, and the other end thereof contacts a stop pin 30, which is fixedly attached to a camera wall portion, and is contactable by the lever arm 28a. The spring 31 exerts a constant force to turn the holding lever 28 clockwise, and bring the arm 28a thereof against the stop pin 30.

Still in FIG. 13, the gear support arm 25 lies against the arm 26f of the lever frame 26, and is rotatably mounted at one end on the same fixed shafts as the lever arms 26a and 26b. On the outer end of this shaft, there is fixedly attached a collar 32, around which the abovementioned wire spring 33 is mounted. One end of the spring 33 presses against the spring holder projection 26j on the lever arm 26f, and the other end thereof contacts a fixed pin 25b which projects from a central portion of the gear support arm 25. The spring 33 exerts a constant force to hold the gear support arm 25 in line with the arm 26f of the lever frame 26, whereby the gear support arm 25 is urged to rotate together with the lever frame 26, but is not in rigid connection therewith. Fixedly attached to the outer end of the support arm 25 there is a small shaft 25a, on which the clutch gear 24 is rotatably mounted.

Referring to FIGS. 10 through 13, the abovedescribed clutch gear 24, gear support arm 25, lever frame 26, and holding lever 28 function as follows in the transfer on an exposed first sheet 1 into a rearmost second sheet 2. In between shots taken by the camera C1, the lever frame 26 is pulled clockwise by the spring 27 to a position in which the contact plate 26e pushes the detection pin 17 towards the pack 5, against the force of the spring 36, the rear end of the pin 17 being in a hole 4c formed in the slack portion connecting to the leader 4 of the last exposed first sheet 1, which has already been removed with the corresponding second sheet 2. In this situation, the hook 26h at the right-hand end of the lever arm 26f is not contacted by the detent portion 28c of the holding lever 28, and the clutch gear 24 is not in engagement with either gear 34 or gear 35.

When now the shutter button 8 is depressed in order to take a photograph, the foremost first sheet 1 in the loaded pack 5 is exposed, and at the same time the contact plate 26d at the end of the lever arm 26a is pushed to cause the lever frame 26 to pivot anticlockwise, counter to the force of the spring 27. This has three results: Firstly, the pressure of the contact plate 26e at the end of the lever arm 26b is released from the detection pin 17, which is therefore moved outwards with respect to the pack 5, by the spring 36, and disengages the small hole 4c associated with the leader 4 of the previously exposed first sheet 1; simultaneously with this action, the detection pin 17 causes a retention means to release a film unit removal means, as described in greater detail later.

Secondly, the gear support arm 25 also is swung anticlockwise due to its connection, through the spring 33, with the lever frame 26, whereby the clutch gear 24 is brought into engagement with the gears 34 and 35. Since the gear support arm 25 is not rigidly connected to the lever frame 26, but is in spring-loaded connection therewith, there is no jolting when the clutch gear 24 is brought into engagement with the gears 34 and 35. Also, the distance through which the clutch gear 24 must be moved to come into engagement with the gears 34 and 35 may be made less than the distance through which the lever frame 26 is moved upon actuation of the shutter release mechanism, thereby ensuring that the clutch gear 24 is brought into firm engagement with the gears 34 and 35, due to the force of the spring 33 acting to bring the gear support arm 25 into line with the lever arm 26f.

Thirdly, the outer portion of the hook 26h at the upper end of the lever frame holder portion 26g is brought into contact with, and pushes the detent portion 28c on the arm 28b of the holding lever 28, whereby the holding lever 28 is pivoted anticlockwise slightly, against the force of the wire spring 31, and the hook 26h is allowed to move past the detent portion 28c. When the hook 26h has been moved completely past the detent portion 28c, the wire spring 31 swings the holding lever 28 clockwise, back to its original position, the detent portion thus being brought into engagement with the hook 26h, whereby the lever frame 26 is retained in a position wherein the contact plate thereof is held out of engagement with the pin 17, and the clutch gear 24 remains in engagement with the gears 34 and 35.

When the shutter release action is terminated, the motor 22 is actuated through a suitable means not shown, whereby drive is supplied via the small gear 21, gear train G2, gear 35, clutch gear 24, gear 34, and gear train G3 to the wind-up gear 23 as shown in FIGS. 11 and 12. Motor drive is also supplied via the gear train G1 to the processing rolls 18, and the motor 22 is kept actuated by a conventional timer or other means, until termination of transfer of the exposed first sheet 1 into the rearmost sheet 2 to form a semi-film unit (1, 2), and complete removal of this film unit from the camera C1. Acting through the wind-up gear 5h (FIG. 4), the wind-up drive gear 23 causes the leader 4 and slack portion 4a of the exposed first sheet 1 to be wound up onto the reel 5g, whereby the exposed first sheet 1 is drawn into the corresponding rearmost second sheet 2 (FIG. 7). While this action is taking place, rotation of the gear 35 brings the pin 35a thereon against the arm 28d of the holding lever 28, whereby the holding lever 28 is pivoted anti-clockwise sufficiently for the detent portion 28c at the end of the arm 28d thereof to be moved out of engagement with the hook 26h of the lever frame 26. Hereupon, the spring 27 pulls the lever frame 26 clockwise, and the contact plate 26e at the end of the lever arm 26b is brought into contact with the detection pin 17, and pushes the pin 17 into the hole 5j leading to the leader slit 5f of the pack 5. At this stage, however, the detection hole 4c' near the end of the leader slack portion 4a has not yet been brought into line with the hole 5j, and the pin 17 therefore rides on the leader 4, or slack portion 4a, and neither the pin 17 nor the lever frame 26 is in its original position, and the clutch gear 24 still remains in engagement with the gears 34 and 35, i.e., drive is still transmitted to the leader wind-up drive gear 23. After the leader 4, and slack portion 4a, have been wound up sufficiently for the exposed first sheet 1 to have been brought completely into the rearmost second sheet 2, and for the rear end of the leader 4 to have been detached from the edge 1g of the first sheet 1 and to have been drawn completely out of the second sheet 2, the detection hole 4c' is brought into line with the hole 5j. Hereupon the detection pin 17 is moved into the hole 4c', due to the action of the spring 27, acting through the lever frame 26 and contact plate 26e, whereby the pin 17 and lever frame 26 are brought back to their original positions, and the clutch gear 24 is moved out of contact with the gears 34 and 35, thus terminating wind-up of the leader 4 until the next first sheet 1' is exposed. As the gear 35 continues to rotate the pin 35a thereof is moved out of contact with the arm 28d of the holding lever 28, which is therefore returned to its original position by the wire spring 31. Also, movement of the clutch gear 24 does not, of course, affect the processing rolls 18, which continue to be rotated by drive supplied thereto via the gear train G1.

The description continues with reference to a semi-film unit removal means, which is shown in FIGS. 14 and 15. The film unit removal means comprises the above-mentioned slide plate 38, the slide plate 40, which is moveable by the slide plate 38, and the extractor arm 39, which is mounted on the slide plate 40, and may extend into the slot 51 of the pack 5 (FIG. 10). Briefly the function of these elements is as follows.

In between shots, the slide plates 38 and 40 and the extractor arm 39 are held in lowermost positions due to the action of a hook 48, which engages the plate 38. During taking of a photograph, the pin 17, when moved forwards by the spring 36 upon termination of shutter action, actuates a means causing the hook 48 to disengage the plate 38, whereupon, simultaneously with the first sheet 1 which has just been exposed being moved into the rearmost second sheet, the plates 38 ahnd 40 are moved to uppermost positions (leftmost in the drawings) by spring means, the extractor arm 39 thereby being brought into a position ready for removal of the film unit (1, 2) being assembled. The abovementioned crank 37 is being rotated at this time by the small gear 21 (FIG. 11), and as the crank 37 rotates, the crank pin 37a thereof is brought into contact with, and pushes the plate 38 (rightwards in the drawing, downwards in the camera C1), the slide plate 38 pushes the slide plate 40, and the extractor arm 39 pushes the film unit (1, 2) out of the pack 5 to the processing rolls 18, which are being rotated at this time, and forward the film unit (1, 2) to the exterior of the camera C1 while causing simultaneous processing thereof. As the crank 37 continues to rotate, the pin 37a is moved out of engagement with the slide plate 38, which by now has been engaged by the hook 48, and remains engaged thereby until the next shot is taken and the detection pin 17 is again moved forwards, out of a leader detection hole 4c'.

In more detail, as shown in FIG. 14, the slide plate 40 is a long, narrow plate which is mounted in a vertical alignment flat against the inner side of the camera rear cover 11, and in which there are formed symmetrically disposed slots 40a and 40b. Studs 44 and 45, which are fixedly attached to the rear cover 11, project through the slots 40a and 40b, respectively, whereby the slide plate 40 may be moved upwards or downwards in a straight line. The extractor arm 39 is constituted by a spring strip, one end of which is fixedly attached to the plate 40, and which inclines forwards from the rear cover 11. The other end of the removal arm 39 forms a hook portion, which may extend into the contact slot 51 at the upper rear of the pack 5, to contact the upper end of a semi-film unit (1,2) i.e., the closed end 2k of a rearmost second sheet 2 (FIG. 2). The slide plate 40 is an attachment to one end of a compression spring 46, whose other end is higher and is fixedly attached to the rear cover 11, and which exerts a constant force to draw the plate 40 to an uppermost position. An integrally formed actuation lever 40c projects sideways from the plate 40, and extends through a slit formed in a side wall portion of the rear cover 11. The actuation lever 40c is contacted by a pawl element 47 mounted on the slide plate 38.

Referring now to FIG. 15, the slide plate 38 has the same general dimensions as the slide plate 40, and is mounted at right-angles thereto, against a side wall portion of the camera C1, and is displaced downwards somewhat compared with the slide plate 40. Like the slide plate 40, the slide plate 38 is moveable upwards or downwards, and is guided in a straight line by studs 41 and 42 which are fixedly attached to the camera side wall and extend through symmetrically disposed slots 38b and 38c, respectively, which are formed in the slide plate 38. Projecting at right-angles to a lower part of the slide plate 38, there is a small integrally formed catch piece 38d, which is engageable by the hook 48, which is provided adjacent to the lowermost end of the plate 38 (right-hand end in FIG. 15), whereby the plate 38 may be retrained in a lowermost position, as described in greater below. A compression spring 43, which is attached at one end to the plate 38 and at the other end to a higher point on the camera side wall exerts a constant force to draw the plate 38 to an uppermost position. At a generally central portion of the plate 38, there is provided a rib 38a, which is at right-angles to the plate 38, and is in fixed or integral connection therewith, and which is contactable by the pin 37a on the crank 37.

During part of the rotation of the crank 37, the crank pin 37a simultaneously slides along and pushes the rib 38a, and the slide plate 38 is moved downwards, counter to the force of the spring 43. As the crank 37 continues to rotate, the crank pin 37a is moved to a point where it no longer contacts with the rib 38a. By this time, however, the slide plate 38 has been moved downwards sufficiently for the catch piece 38d thereof to have been brought into engagement with the hook 48. As described below, this downward movement of the slide plate 38 causes the extractor arm 39 to move an assembled film unit (1, 2) out of the pack 5 and into engagement with the processing rolls 18. Processing of a film unit (1, 2) and forwarding thereof out of the camera C1 is the longest action during taking of a photograph, and, since the crank 37 continues to be rotated during this time, function of the hook 48 is to ensure that the slide plate 38 is not actuated unnecessarily during film unit processing and removal, i.e., to ensure that the extractor arm 39 removes one film unit (1, 2) only for each photograph taken.

The hook 48 is constituted by two arms 48a and 48b, which are integral attachment, and at right-angles to one another, and are pivotally mounted on a fixed pin 50 passing through the junction thereof, the arm 48a being generally parallel to the bottom wall of the camera C1, and the arm 48b being generally parallel to the slide plate 38. The outer end of the arm 48b forms an angled end 48c for engagement of the slide plate catch piece 38d. A compression spring 49 which is attached to one end to the arm 48a and at the other end to a camera fixed wall portion, exerts a constant force to pivot the hook 48 anticlockwise and into an alignment for engagement of the slide plate 38. The arm 48a has a length slightly greater than the thickness of the pack 5, and the end thereof is pivotally attached to one end 51a of a crank-actuated rod 51. The other end of the rod 51 is pivotally, and to a small extent slidably, mounted on a pin fixedly attached to an off-centre position on a crank wheel, not shown. This crank wheel is actuated by the detection pin 17, which is pivotally connected, either directly, or through a suitable extension means, to another off-centre pin fixedly attached to the crank wheel, action of the pin 17 being such that the crank wheel is rotated once each time the pin 17 leaves a leader detection hole 4c and subsequently enters the next hole 4c'. When the pin 17 is moved outwards from a hole 4c, the rod 51 is moved (leftwards in the drawing), and pivots the hook 48 clockwise, counter to the force of the spring 49, whereby the angled end 48c of the arm 48b is moved out of a position for engagement of the catch piece 38d of the slide plate 38. As noted earlier, removal of a semi-film unit (1, 2) is effected when the detection pin 17 is in a leader hole 4c'. At this time, due to the fact that the rod end 51a is in pivotal attachment to the hook 48 and the rod end 51b is in slightly slidable attachment to the pin on the actuating crank wheel, when the slide plate 38 is moved downwards by the crank pin 37a, the hook 48 may be pivoted slightly clockwise by the slide plate catch piece 38d, which presses, and is allowed to move past the hook angles end 48c, after which the hook 48 is again moved anticlockwise by the spring 49 and engages the slide plate 38.

Still referring to FIG. 15, the abovementioned pawl element 47 is pivotally mounted on a pin 38e fixedly attached to a lower portion of the slide plate 38, and comprises an arm which contacts the actuation lever 40c of the slide plate 40, and an arm which contacts a stop stud 38f affixed to the plate 38. The pawl element 47 is spring-loaded by a wire spring 47a, which acts to pivot the pawl element 47 anticlockwise, and bring the pawl element 47 into a normal configuration in which one arm thereof is pressed against the stop stud 38f, and the other arm thereof projects beyond the edge of the plate 38. In this configuration, when the slide plate 38 is moved downwards by the crank pin 37a, the projecting arm of the pawl element 47 is moved against and presses the actuation lever 40c, whereby the slide plate 40 also is moved downwards, against the force of the spring 46. When the slide plate 40 is thus moved downwards, the film unit extractor arm 39 contacting the top end of an assembled film unit (1, 2) through the slot 5l of the pack 5 pushes the film unit (1, 2) downwards, through the removal slit 5k, to bring the lower end thereof into engagement with the processing rolls 18, which are currently rotated by drive from the motor 22 supplied thereto through the small gear 21 and gear train G1 (FIGS. 11, 12). The plate 38, and hence plate 40 and extractor arm 39 also, are now held in lowermost positions due to the engagement of the catch piece 38d by the hook 48, while the film unit (1, 2) continues to be drawn out of the pack 5 by the processing rolls 18, and guided thereby through the passage formed in the lower part of the camera C1. During this withdrawal of the film unit (1, 2), the processing solution pod 2e of the second sheet 2 thereof is broken open, whereby the processing solution is spread in a viscous layer between the first sheet and the second sheet 2, and an image corresponding to the negative image on the first sheet photosensitive layer 1a is formed on the second sheet positive image layer 2a, and is viewable through the second sheet transparent support layer 2b. At the same time, the micro-capsules of adhesive contained in the bonding strips 2l and 2h at opposite ends of the second sheet 2 are also broken open due to the pressure applied by the processing rolls 18, and the second sheet's insertion opening 2A and leader slit 2B are sealed by adhesive extruded therefrom. The first sheet 1 carrying a negative is thus contained and protected in the second sheet 2, but may be subsequently separated therefrom if required in order to obtain further copies of the same photograph.

If, at this stage, it is required to unload the pack 5 currently in the camera C1, when the camera rear cover 11 is opened in order to effect this, the actuation lever 40c of the slide plate 40, which is mounted on the inside of the rear cover 11 (see FIG. 14), is moved out of engagement with the pawl element 47 mounted on the slide plate 38, and the slide plate 40 is therefore moved to an uppermost position by the spring 46. Since opening of the rear cover 11 does not affect hook 48 action, the slide plate 38 is still retained in a lowermost position, i.e., when the rear cover 11 is re-closed, the pawl element 47 on the plate 38 will be below the actuation lever 40c of the plate 40. However, after loading of a new pack, for example, when the next shot is taken, and the hook 48 is caused to disengage the slide plate 38 by the detection pin 17 moving forwards upon termination of shutter action, the spring 43 may move the slide plate 38 to its uppermost position since the pawl element 47 may be pivoted clockwise. That is, during upward movement of the plate 38 the pawl element 47 is brought into contact with, and pivoted clockwise by the actuation lever 40c, i.e., away from the stop stud 38f, and is allowed to pass the actuation lever 40c, after which the spring 47a returns the pawl element 47 into a normal alignment, for engagement of the actuation lever 40c upon subsequent downward movement of the plate 38. Thus, a film pack may be loaded or unloaded at any time without hindrance to camera operation.

The action of the abovedescribed camera C1 is resumed below in reference to the flowchart of FIG. 16.

(a) First, the lever frame 26 is swung anticlockwise, simultaneously with the start of shutter action by depression of the shutter button 8. This brings the lever frame 26 into engagement with the holding lever 28, and at the same time the spring 36 is allowed to move the detection pin 17 out of the detection hole 4c of the leader 4 of the previously exposed first sheet 1, and the clutch gear 24 is brought into engagement with the gears 34 and 35.

(b) Simultaneously with movement of the pin 17 out of the hole 4c, the hook 48, which up to now has been holding the slide plate 38, and hence slide plate 40, in a lowermost position, is pivoted out of engagement with the catch piece 38d, whereupon the slide plates 38 and 40 are moved to uppermost positions by the springs 43 and 46, respectively, and the extractor arm attached to the slide plate 40 is brought into engagement with the outer side of the closed end 2k of the rearmost second sheet 2, this closed end 2k constituting the top end of subsequently assembled film unit (1, 2).

(c) Upon termination of the shutter action, a suitable means (not indicated in the drawings) actuates the motor 22, which now supplies drive through the gear train G1 to the processing rolls 18, and through the gear train G2, clutch gear 24, and gear train G3 to the gear 23. The gear 23 therefore drives the reel 5g to wind up the leader 4, which is drawn through the transfer portion 5d' of the pack 5, and pulls the first sheet 1 into the rearmost second sheet 2, via the second sheet opening 2A, the first sheet being turned around at the same time, so that the lightproof layer 1c thereof is brought into contact with the positive image layer 2a of the second sheet 2.

(d) Shortly after start of drive by the motor 22, the pin 35a on the gear 35 swivels the holding lever 28 out of engagement with the lever frame 26, which is therefore pivoted by the spring 27 into contact with the detection pin 17, and causes the pin 17 to enter the opening 5j in the pack 5 and press against the leader 4, which is still being wound up.

(e) The hole 4c of the leader 4 comes into line with the opening 5j of the pack 5, and the detection pin 17 enters the hole 4c, whereupon the clutch gear 24 is moved out of engagement with the gears 34, 35, and drive to the gear 23, and hence wind-up of the leader 4, stops. By this time the leader 4 has been detached from the first sheet edge 1g and has been drawn completely through the slit 2B of the second sheet 2, the first sheet 1 and second sheet 2 thus constituting an independent, unattached film unit (1, 2).

The detection pin 17 now being in a leader detection hole 4c', the pin 17 and rod 51 have no effect on hook 48 action.

(f) Rotation of the crank 37 causes the crank pin 37a to come into contact with the rib 38a and push the slide plate 38 downwards, whereupon the slide plate 38 pushes the slide plate 40 also downwards, and the extractor arm 39 pushes the film unit (1, 2) out through the pack removal slit 5k, and as far as the processing rolls 18.

(g) The processing rolls 18 engage the film unit (1, 2) and draw it completely out of the pack 5, at the same time causing the bonding strip 21 to close the insertion opening 2A of the second sheet 2, and breaking the pod 2e and causing the processing solution therefrom to be spread in a layer between the first sheet 1 and second sheet 2.

At this stage, the slide plate 38 has been brought into engagement with the hook 48, which retains the slide plate 38, together with the slide plate 40, until the next shot is taken.

(h) The film unit (1, 2) continues to be withdrawn out of the camera C1, while an image is developed due to the action of the processing rolls 18, which also cause the bonding strip 2h to close the leader slit 2B of the second sheet 2. After a sufficient time for the film unit (1, 2) to have been moved completely through the rolls 18, or upon actuation of a suitable electronic means for detection of passage of a film unit (1, 2) through the rolls 18, for example, i.e., when the film unit (1, 2) has been processed and is projecting to the exterior of the camera C1 through the extraction slot 19, the motor 22 is stopped, and drive to the various gears and other elements is stopped until the next exposure.

The description will continue in reference to FIGS. 17 through 26, which show another embodiment of the invention wherein leaders are dispensed with, and exposed first sheet 1 are transferred into corresponding second sheets 2 by means provided in a camera C2. This embodiment of the invention may employ, for example, film units such as described earlier in reference to FIG. 3.

FIG. 17 is a general perspective view showing the front of a film pack 52 employed in this embodiment of the invention. The pack 52 is a fairly flat, rectangular case made of thermosetting plastic, or other suitably rigid, lightproof material, and in the front wall thereof there is formed a large exposure opening 52a, through which a foremost first sheet 1 may be exposed. Communicating with the upper side of the exposure opening 52a there are formed two parallel channels 52c, 52c', which permit movement of a removal pawl 55, or pawls 55, 55', described below, which are provided in the camera C2 for removal of an exposed first sheet 1 from a foremost position in the pack 52, as shown in FIG. 20. In the bottom wall 52d of the pack 52 there is formed a slit 52b, which is in line with a foremost first sheet 1, and permits removal thereof from the pack 52.

As shown in FIG. 18, the rear portion of the bottom wall 52d and the bottom portion of the pack rear wall are cut away to form a transfer opening 52e, via which a first sheet 1 may be transferred into a corresponding, rearmost second sheet 2, or an assembled film unit (1, 2) may be removed from the pack 52. At the rear edge of the bottom wall 52d there is formed a pair of small platforms 52g, which are in integral attachment to the bottom wall 52d, and extend a short distance parallel to the pack front wall. Near a top corner of the pack rear wall there is formed a slot 52h, which permits a removal pawl 59, described below, to contact the top end of a rearmost second sheet 2, and to remove an assembled film unit (1, 2).

In FIG. 19, first sheets 1 are held parallel to the pack front wall by a plate spring 53, and the second sheets 2 are pressed rearwards by legs 53a of the plate spring 53. In this configuration, the foremost first sheet 1 is held in correct alignment with the pack front opening 52a, and the pawl engagement holes 1e (see FIG. 1) thereof are in line with the channels 52c formed in the pack front wall and communicating with the large opening 52a. A retainer pin 52i attached to the pack front wall extends rearwards through all the bayed notches of the first sheets 1, to assist correct positioning of the first sheets 1. The lightproof subsidiary second sheet 2d of the rearmost second sheet 2 is in flat contact with the pack rear wall, but the main second sheet portion 2c thereof and all the other second sheets 2 are retained in a forwardly inclined alignment by the small platforms 52g, the leftside opened end provided the bonding strip 21 of the rearmost second sheet 2 being in direct contact with the platforms 52g. The closed end 2k of the rearmost second sheet 2, which is the top end thereof, is in line with a small recess 52j formed in the pack top wall. As described in greater detail below, when an exposed first sheet 1 is transferred into the rearmost second sheet 2, the leading edge 1g of the first sheet 1 pushes the top end of the second sheet 2 into the recess 52j, whereupon the opened end with the bonding strip 21 of the rearmost second sheet 2 is moved out of contact with the platforms 52g, and the whole of the main second sheet portion 2c of the rearmost second sheet 2 moves into an alignment parallel with the pack rear wall. At the same time the subsidiary second sheet 2d' of the next rearmost second sheet 2' also moves parallel to the pack rear wall, but the main second sheet portion 2c' thereof is retained in a forwardly inclined alignment due to contact of the bonding strip 21' thereof with the platforms 52g.

Referring to FIG. 20 there is shown a camera C2 according to the second embodiment of the invention. In the upper portion of the camera C2 there is provided a pair of push pawls 55, only one of which is shown, and which are in line with the channels 52c at the top of the pack exposure opening 52a in the pack front wall and engage the holes 1e formed in the stiff strip 1c of the foremost first sheet 1. Each push pawl 55 is spring-loaded by a wire spring 68, which urges the pawl 55 towards the pack 52. The transfer slit 52b of the loaded pack 52 is in line with a pair of first transfer rollers 56, which are provided at one end 57a of a curved transfer passage 57. The passage 57 describes a U-turn in the lower part of the camera C2, and the other end 57b thereof is in line with the transfer opening 52e at the rear of the pack 52, and has provided therein second transfer rollers 58, which are provided as two pairs of rollers on opposite sides, i.e., left and right, of the rear end 57b of the transfer passage 57. The reason for the second transfer rollers 58 being provided as two separate pairs of rollers is to permit movement of a press-down plate 59, described below, which is mounted in the camera C2, and is adjacent to the transfer opening 52e of the loaded pack 52. The second transfer rollers 58 and pack transfer opening 52e are also in line with the upper end of a film unit removal passage 61, which leads downwards, through the lower part of the camera C2, to an exit 64 communicating with the exterior of the camera C2. Within the removal passage 61 there is provided a pair of processing rolls 62, and below the rolls 62 there is provided a pair of elements 63, which have pile surfaces and ensure exclusion of light from the upper part of the removal passage 61, but permit passage of a film unit (1, 2) therethrough. Behind the upper rear portion of the pack 52 there is provided a film unit removal hook 60, which extends forwards and may enter the slot 52h at the upper rear of the pack 52. As shown also in FIG. 21, in the lower front portion of the camera C2 there are provided two motors 65 and 66. Acting through cams and gears described below, the motor 65 actuates the push pawls 55, the press-down plate 59, and removal hook 60, and controls forward or reverse drive of the motor 66. The motor 66 drives the first and second transfer rollers 56 and 58 and the processing rolls 62.

In reference now to FIG. 21, the spring-loaded push pawls 55 are mounted on opposite sides of a slide block 67. The slide block 67 may be moved upwards or downwards, and is guided in this motion by a guide pin 69, which is fixedly attached thereto and extends forwards from the slide block 67, and may slide in a vertical groove 70 formed in a solid upper portion of the camera C2. Control of the slide block 67, and hence of the push pawls 55, is effected by a straight lever 72, which is pivotally mounted on a fixed pin 71, and whose left-hand end is in pivotal attachment to the guide pin 69. A compression spring 73, which is attached to the lever 72 at a point between the pivot pin 71 and guide pin 69, exerts a constant force to pivot the lever 72 clockwise, whereby the slide block 67 is normally held in an uppermost position. In this position of the block 67, the pawls 55 simply engage the holes 1e of the foremost first sheet 1, and exert no pressure on this first sheet 1.

Still referring to FIG. 21, and also referring to FIG. 23, an integrally attached stud 72a projects from the rear of the right-hand end of the lever 72. The stud 72a is contacted by a projection 89e extending from the upper portion 89a of a slidable plate 89, which is mounted against a camera side wall, and is moveable upwards or downwards. Movement of the plate 89 is guided by pins 90 and 91, which are fixedly attached to the camera side wall, and which respectively extend through an elliptical slot 89c formed in a lower extension of the plate 89, and in an elliptical slot 89d formed in the plate 89a. A cam follower pin 89b extends from the plate 89, and is contacted by a cam 86, which has a single lobe 86a extending over a comparatively small portion of the periphery thereof, and is driven through suitable gears by the motor 65 in the lower portion of the camera C2. Normally, when the pin 89b of the plate 89 contacts the major portion of the cam 86, the plate 89 is held in a lowermost position, due to the action of the spring 73 and contact of the pin 72a with the plate extension 89e. In any one revolution of the cam 86, the plate 89 remains in this lowermost position during most of the time, whereby the slide block 67 and push pawls 55 remain in uppermost positions. When the cam lobe 86a is brought into contact with the pin 89b of the plate 89, the plate 89 is pushed upwards, and the plate extension 89e pushes the pin 72a, causing the lever 72 to pivot anticlockwise, against the force of the spring 73, whereby the push pawls 55, 55' are moved downwards, and push the foremost first sheet 1 out of the pack 52, through the slit 52b, and downwards a sufficient distance for the lower end thereof to be engaged by the first transfer rollers 56 in the transfer passage 57, as shown in FIG. 20. As the cam 86 continues to rotate, and the cam lobe 86a is moved out of contact with the pin 89b, the lever 72 is turned clockwise again by the spring 73, and the block 67 and pawls 55, 55' are moved upwards again, the pawls 55, 55' being turned slightly against the force of the wire springs 68 as they are pulled clear of the engagement holes 1e of the first sheet 1.

Referring back to FIG. 20, the press-down plate 59 is inclined upwards, and one end thereof is mounted on a support block 74, which is slidable in a manner described below along a vertical passage 74a formed in the lower rear portion of the camera C2. The press-down plate 59 is constituted by a spring plate which is fixedly attached at one end to the block 74 and inclines forwards, and slightly away therefrom, or by a rigid plate which may swivel through a small angle relative to the block 74, and is loaded by springs 59a, which, when the block 74 is at the upper end of the passage 74a, hold the plate 59 inclined away from the block 74, as indicated by the solid line portion of FIG. 20. In this configuration, the press-down plate 59 extends through the pack transfer opening 52e and into the opening 2A of the rearmost second sheet 2 in the pack 52. When the support block 74 is drawn downwards into the passage 74a, the front wall of the passage 74a pushes the plate 59 rearwards, whereby the plate 59 also may be drawn into the passage 74a, as indicated by the chain-dot line portion of FIG. 20.

Referring now to FIG. 22, upward and downward movement of the support block 74 is guided by a pin 76, which is fixedly attached thereto, and rides in a groove 75 formed in a wall of the passage 74a. The right-hand end of a straight lever 77, which is pivotally mounted on a fixed pin 77a, is in pivotal attachment to the guide pin 76. A compression spring 78, which is attached at one end to a right-hand portion of the lever 77, and at the other end to a fixed portion of the camera C2, exerts a force to pivot the lever 77 anticlockwise, whereby the support block 74 and press-down plate 59 mounted thereon are normally held in an uppermost position.

Still referring to FIG. 22, and also referring to the lower portion of FIG. 23, a fixedly attached contact stud 77a projects from the left-hand end of the lever 77, and is contacted by the rearwardly projecting leg 92d of a vertically aligned slidable actuation plate 92. The actuation plate 92 may be moved upwards or downwards, and is guided in this motion by pins 93 and 94 which are fixedly attached to a camera internal wall portion, and, respectively, project through vertically aligned slots 92b and 92c formed in the plate 92. A cam follower stud 92a is fixedly attached to an upper portion of the actuation plate 92, and is contacted by a rotatable cam 87, which is driven by the motor 65 acting through suitable gears. The cam 87 comprises a narrow lobe 87a and a broad lobe 87b, other portions thereof having a radius such that the actuation plate 92 may be held in a lowermost position due to the force of the spring 78, acting through the lever 77, stud 77a, and plate leg 92d. Thus, in one revolution of the cam 87, the actuation plate 92 is held in a lowermost position, then, when the narrow lobe 87a is brought into contact with the stud 92a, is moved upwards for a short time, then allowed to be moved down again, then moved up and held in an uppermost position for a comparatively longer time, when the broad lobe 87b contacts the stud 92a, and is finally moved back to a lowermost position. The corresponding movement of the press-down plate 59 is that the plate 59 first extends into the pack 52, and opening 2A of the rearmost second sheet 2, is then drawn into the passage 74a for a short time, then moved back to project into the pack 52 and second sheet opening 2A, then drawn into the passage 74a for a comparatively longer time, and then moved back into the pack 52 and second sheet opening 2A.

Referring to FIGS. 20 and 22, the film unit removal hook 60 is provided in line with the rear slot 52a of the pack 52, and is fixedly attached to and projects forwards from a slidable support plate 79, which is aligned parallel to the camera rear cover, and in which there are formed vertically aligned slots 79a and 79b. Pins 80 and 81, which are fixedly attached to a camera wall portion, project through the slots 79a and 79b, respectively, whereby the support plate 79 may be slid upwards or downwards. A compression spring 82, which is attached at one end to a lower portion of the plate 79, and at the other end to a camera fixed wall portion below the plate 79, pulls the plate 79 downwards as far as is permitted by a cam 83, which contacts a stud 79c projecting from the plate 79.

As shown in a central portion of FIG. 23, the cam 83 comprises a lobe 83a, a large recessed portion 83b, and a circular periphery portion 83c. Referring to FIGS. 22 and 23, when the circular periphery portion 83c contacts the stud 79c, the support plate 79 is allowed to be pulled by the spring 82 to a position wherein the pins 80 and 81 are slightly below the centres of the slots 79a and 79b, and the removal hook 60 projects through the rear slot 52h of the pack 52, and into the recess 52j (FIG. 19). Drive is supplied to the cam 83 from the motor 65, through suitable gears train G4, and when the cam 83 is rotated, and the lobe 83a thereof is brought into contact with the stud 79c, the plate 79 is moved upwards to the position indicated by the chain-dot line portion of FIG. 22, and the hook 60 is moved upwards through the slot 52h, to above the top of the pack 52. When the cam recessed portion 83b comes into contact with the stud 79c, the spring 82 is allowed to pull the plate 79 downwards sufficiently for the film unit removal hook 60 to be brought to the bottom of the slot 52h.

Referring to FIG. 24, the motor 66 supplies direct drive to a large gear 96, and to a gear 56a, which transmits drive to the first transfer rollers 56. The large gear 96 engages and drives a gear 58a, by which drive is transmitted to the two pairs of rollers constituting the second transfer rollers 58, and a gear 62a, by which drive is transmitted to the processing rolls 62. As indicated in FIG. 23, actuation of the switch 95 is effected by a two-diameter cam 88, which contacts the actuation rod 95a of the switch 95, and is driven by the motor 65 acting through the gear train G4. For the purpose of the present description, forward drive is taken to mean rotation of the first transfer rollers 56 to draw a first sheet 1 out of the pack 52, and rotation of the second transfer rollers 58 to move a first sheet 1 into the pack 52, and reverse drive is taken to mean rotation of the second transfer rollers 58 and processing rolls 62 to draw a film unit (1, 2) out of the pack 52 and camera C2.

Figure 26:
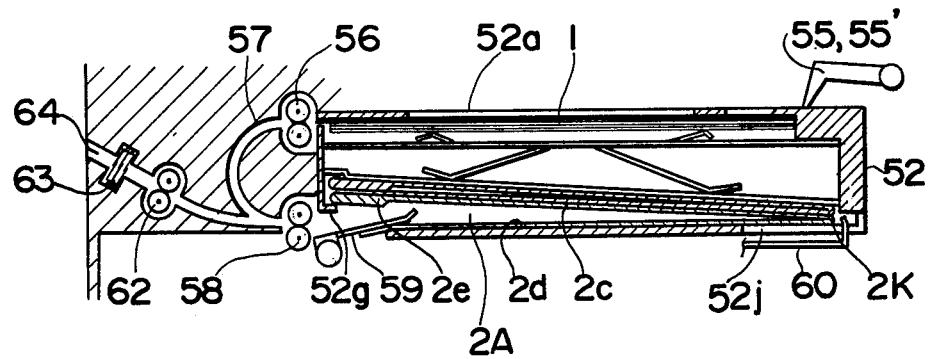

Action when a photograph is taken is described below in reference to the timing chart of FIG. 25, and to FIG. 26.

In FIG. 26(a), when the camera shutter is actuated to expose the foremost first sheet 1 in the pack 52, through the front opening 52a, the push pawls 55 are in withdrawn (i.e. uppermost) portions, the press-down plate 59 extends into the opening 2A of the rearmost second sheet 2, the free end 2e of the main second sheet 2c lies on the platforms 52g of the pack 52, this end of the second sheet 2 thus forming a wide opening to permit insertion of the first sheet 1, and the film unit removal hook 60 extends into the slot 52j, and is adjacent to the closed end 2k of the second sheet 2.

Termination of the shutter action is detected by a suitable means, which thereupon actuates the motors 65 and 66.

In FIG. 26(b), when the motors 65 and 66 are actuated the first and second transfer rollers 56 and 58 are driven forwards, and the cam 86 causes the push pawls 55 to push the exposed first sheet 1 out of the pack 52 and into engagement with the first transfer rollers 56 (see also (a) in FIG. 25).

In FIG. 26(c), the first sheet 1 is moved by the first transfer rollers 56 through the passage 57, to the second transfer rollers 58, which guide the first sheet 1 into the wide opening formed by the second sheet 2.

Next, as shown in FIGS. 26(d) and (b) of FIG. 25, the cam 87 causes the press-down plate 59 to be withdrawn temporarily into the passage 74a, and then to be moved again into the opening 2A of the second sheet 2, as indicated in FIGS. 26(e) and (c) of FIG. 25, whereby the press-down plate 59 is first moved to below the exposed first sheet 1, and then moves up again and pushes the first sheet 1 further into the envelope constituted by the second sheet 2.

In FIG. 26(f), while the first sheet 1 is being advanced into the second sheet 2, the film unit removal hook 60 is temporarily moved out of the pack 52 (FIG. 25(d)), due to rotation of the cam 83. As the first sheet 1 continues to be advanced into the second sheet 2, the end of the first sheet 1 comes into contact with the closed end 2k of the second sheet 2, whereby the second sheet 2 is pushed into the recess 52j of the pack 52. When the second sheet 2 is thus moved, the free end of the main second sheet 2c is moved out of contact with the platforms 52g, and the main second sheet 2c moves into flat contact with the first sheet 1.

In FIG. 26(g), next, the press-down plate 59 is moved out of the second sheet 2 and pack 52, and the second sheet 2 together with the enclosed first sheet 1 now constitutes a semi-film unit (1, 2) ready for processing, and in line with the transfer opening 52e of the pack 52. At the same time, the motor 66, and hence rollers 58 and rolls 62 are switched to reverse drive, by the cam 88 acting through the switch 95 (see (f) of FIG. 25).

In FIG. 26(h), as the cam 83 continues to rotate, the removal hook 60 is moved into contact with the top end of the film unit (1, 2), as indicated also in (e) of FIG. 25, and pushes the film unit (1, 2) into engagement with the second transfer rollers 58.

The transfer rollers 58 move the film unit (1, 2) through the removal passage 61, into engagement with the processing rolls 62, which move the film unit (1, 2) to the exit 64 of the passage 61, while simultaneously applying pressure to cause the bonding strip 2g to seal the second sheet 2, and causing the processing solution from the container 2e to be spread between the first sheet photosensitive layer and second sheet positive image layer 2a.

Complete removal of the processed film unit (1, 2) from the camera C2 is detected by a suitable means, which stops the motor 65 and 66, thus terminating action for one exposure.

Needless to say, film units employed in association with the first and second embodiments described should be associated with means for ensuring protection of film units from exposure prior to loading thereof into a camera.

FIGS. 27 through 30 illustrate other types of semi-film unit which may be employed in association with the camera C1 according to the first embodiment of the invention. In the film unit shown in FIGS. 27 and 28, the second sheet 2 comprises a positive image layer 2a', which is coated on a transparent support layer 2b', and is in attachment along one edge only to a lightproof sheet 2d'. Along the edge of attachment of the layer 2c' and sheet 2d', the sheet 2d' is bent towards the image layer 2c', and there is provided a processing solution container 2e', as shown most clearly in FIG. 28. Between the image layer 2c' and lightproof sheet 2d', at this attached end 2f, there is formed a slit 2B', which permits passage of a leader 4', but not of a first sheet 1'. After exposure, the first sheet 1' which comprises a photosensitive layer 1a' on a lightproof support layer 1b', is drawn by the leader 4' between the image layer 2c' and lightproof sheet 2d' of the second sheet 2' until the end thereof 1 comes into contact with the second sheet attached end 2f. After this, further wind-up of the leader 4 causes detachment thereof from the first sheet 1', the first sheet 1' and second sheet 2' thus constituting an independent semi-film unit (1', 2'), which is subsequently transferred to between processing rolls to effect closure of the first sheet 1' in the second sheet 2', the first sheet 1' is bordered by an adhesive band 1S, which comprises, for example, adhesive contained in micro-capsules embedded in a layer of isocyanate and amino compounds in a solvent such as xylene, and the lightproof sheet 2d' is bordered by a bonding agent such as crude rubber. When the film unit (1', 2') is passed between the processing rolls, the processing solution is extruded from the container 2e', to produce a positive image on the image layer 2a', and the micro-capsules in the band 1S of the first sheet 1' are broken open, whereby the first and second sheets 1' and 2' are bonded along all edges. The processing solution spread between the first and second sheets 1' and 2' being viscous, there is no necessity for provision of a separate bonding agent to cause bonding of the first and second sheets 1' and 2'.

FIGS. 29 and 30 illustrate a semi-film unit wherein a first sheet 1" is constituted by a lightproof support layer, 1b", on which are successively coated a positive image layer 1p, on which a photo-image can be formed by diffusion-transfer process, a white light reflection layer 1q, which comprises, for example, a hydrophilic colloid containing titanium white, a lightproof layer 1r, which comprises a hydrophilic colloid containing a substance absorptive of light, but permeable to processing solution, and a photosensitive layer 1a". The corresponding second sheet 2" is shown in FIG. 30, and is simply a single sheet, for example, of black plastic, which carries a processing solution container 2e" at one end, and the opposite end 2a' of which is curled back. A leader slit 2B" is formed in the curled-back end 2a", whereby an exposed first sheet 1" may be drawn by a leader 4" onto the second sheet 2" until the end of the first sheet 1" comes into contact with the curled-back end 2a", after which further wind-up of the leader 4" causes the leader 4" to be detached from the first sheet 1", and drawn through the slit in the second sheet end 2a", thus leaving an unattached, independent semi-film unit (1", 2"), wherein the exposed photosensitive layer 1a" lies rearmost, i.e., against the second sheet 2". When the film unit (1",2") is transferred from the camera, in the manner described above, the processing solution is extruded from the container 2e", and spread between the first and second sheets 1" and 2", and through the photosensitive layer 1a", lightproof layer 1r, and white light reflection layer 1q, to the positive image layer 1p, whereby a positive image which is viewable through the transparent support layer 1b" is formed in layer 1p. The processing solution being viscous, bonding between the first and second sheets 1" and 2" is effected automatically, and no special provision is necessary. However, the first sheet 1" should be bordered by a band of light-proof paint, or similar material, to prevent entry of light via the edges of the completed film unit (1", 2").

Needless to say, film units with first sheet and second sheet constructions the same as described in reference to FIGS. 27 through 30, but not associated with leaders 4', 4" may be employed in a camera C2 according to the second embodiment of the invention.

Also, if so required, in film units employed in association either with the camera C1 or with the camera C2 the first sheet 1',1" may be simply a photosensitive layer on a suitable support layer that is exposable to form a negative image which is developable in a tank development process, and the second sheet simply constitute a lightproof envelope for the first sheet, in this case a complete film unit being only extracted from a camera, and subsequently processed in a separate location. An advantage of this type of semi-film unit over conventional roll-film, for example, would be that, since film packs are easily interchangeable in a camera of the invention, film units having various speeds or other qualities, may be loaded at different times, in order to meet the requirements of photographing scenes of different types or in different ambient light conditions, which action is impossible, or difficult, with roll-film.

Thus in a camera according to the invention there may be employed semi-film units in which there may be various combinations of first sheet construction and second sheet construction, thereby effectively making possible a great variety of different types of film unit in one and the same camera. Also, because of this possibility of selecting different combinations of film unit construction, according to the invention an auto-process camera is not limited to one type of construction, since first sheet and second sheet structure may be variously combined so that, in effect, a photosensitive layer for formation of a negative image lies in front of or behind a positive image layer, and so the camera may therefore, for example, have an optical system including or not including a mirror or mirrors, for example.

Other principal advantages are that (a) since there is provided a first space wherein photosensitive sheets, each of which has a cross-section of even thickness, are accommodated, and are pressed evenly towards an exposure opening, photosensitive sheets are easily held in correct alignment for exposure, thereby ensuring good, even quality prints;

(b) By providing a second space in which, regardless of the position and attitude of a camera, envelopes are held in place by a pressure means, and successively moved into a position for reception of successive exposed photo-sensitive sheets, to constitute successive independent semi-film units, a film pack according to the invention makes it possible, at each successive shot taken, for a film unit to be moved correctly and independently from a camera, regardless of the attitude of the camera, and without any unrequired attached elements which must be dealt with by a photographer;

(c) since leaders to draw semi-film units to processing rolls or similar means are rendered unnecessary, loading of a film pack into a camera is made easier, and it is also possible to unload a film pack from a camera when the pack still contains unexposed film units; for example, this is advantageous when a loaded pack contains only 2 – 3 unexposed film units, and a photographer anticipates taking 6 – 8 shots in rapid succession, (d) completed photographs removed from a camera are unaccompanied by unnecessary items which have to be manipulated or dealt with by a photographer, or may constitute litter;

(e) when required, auto-processing of film units may be carried out in a normal, conventional manner, to obtain positive prints immediately, but when conditions are such that processing solution is ineffective, for example, in a cold location, by making a simple adjustment, a photographer may obtain exposed but unprocessed film units which are enclosed in lightproof protective envelopes, and may be preserved until brought to a location having suitable temperature conditions, and then passed through pressure and processing means provided independently of a camera;

(f) In one and the same camera it is possible to employ different types of film, for example, film developed by diffusion-transfer process within a camera, or normal film subsequently developed in a special location; and (g) Since it is possible to select a large variety of combinations of structures of photosensitive sheets and of envelopes containable in a pack according to the invention, the invention is of wide application, and may be associated with, for example, auto-process film, or with film used in various other photographic processes.

It is believed that the novel features and advantages of a camera according to the present invention will be apparent without further description. Also, needless to say, the invention is not limited to the exact matters shown and described above only as preferred matters given by way of example, and the scope of the invention should therefore be determined from the following claims.

What is claimed is:

1. A film pack for use in a photographic camera of self-developing type, said camera including means for drawing out semi-film units from said pack and means for applying pressure to said semi-film units during semi-film unit drawing out, said pack comprising, in combination:

a plurality of first sheets stacked in light-shielding relation to each other, each of said first sheets having a photosensitive layer exposable to a target object to be photographed through an objective lens assembly of the photographic camera thereby to form thereon a latent image of said target object;

a stack of a second sheets equal in number to said first sheets, each of said second sheets having dimensions generally matching those of said first sheets, each of said second sheets further having a breakable container for processing solution carried at one end thereof;

a casing having a pair of opposite front and rear panel portions, a pair of opposite end walls and a pair of opposite side walls, said front panel portion having defined therein a light-transmitting area which is adapted to be aligned with the optical axis of the objective lens assembly of the photographic camera for admitting light therethrough, said casing further having front and rear compartments in terms of the film exposure direction divided by at least one intermediate wall member housed within said casing and urged in one direction towards said light-transmitting area;

said first sheets being housed within said front compartment and so biased by said intermediate wall member with the foremost one of said first sheets in terms of film exposure direction aligned with said light-transmitting area in readiness for receipt of said light through said light-transmitting area, while said second sheets are housed within said rear compartment;

means forming a passage through which said first sheets are successively guided one at a time from said front compartment towards said rear compartment such that any one of said first sheets after having been exposed to the light coming through the objective lens assembly by way of said light-transmitting area is drawn out of said front compartment in a first endwise direction and then turned over approximately 180° into said rear compartment, said first sheet thus drawn being, when entering said rear compartment, moved in a second direction opposed to said first direction, said first sheet so transported to said rear compartment being held in facing contact with the rearmost one of said second sheets to form a semi-film unit;

a first elongated slot formed in one of said end walls adjacent the respective breakable containers of said second sheets in the stacked condition within said rear compartment, said first elongated slot being positioned adjacent said rear panel portion and extending intermediately between said opposite side walls and operatively positioned with respect to said camera drawing out means for permitting said semi-film units to be drawn out of said film pack through said rear compartment in a direction opposed to said second direction along which said first sheet within said front compartment is fed into the rear compartment;

a second elongated slot formed in the other of said opposite end walls in opposed relation to said first elongated slot;

a take-up chamber extending externally of said casing in parallel relation to said other of said opposite end walls, said take-up chamber being in communication with said rear compartment through said second elongated slot and having therein a built-in take-up spindle;

connecting members each having one end releasably coupled to one end of said first sheet and the other end secured to said take-up spindle, a substantially intermediate portion of said connecting member extending from said front compartment to said rear compartment within said casing and past the corresponding second sheet into the take-up chamber through said second elongated slot such that, when said take-up spindle is rotated in one direction, the first sheets are successively drawn from the front compartment towards the rear compartment one at a time to form the corresponding semi-film units, and wherein said camera means for applying pressure to said semi-film unit thereby spreads the processing solution to allow the processing solution to develop a visually identifiable image corresponding to the latent image and also to form an integral film unit which is composed of the first and second sheets and which is completely independent from the remaining other first and second sheets.

2. The film pack as claimed in claim 1, wherein said guiding means includes a curved passage defined within said casing between said one of said opposed end walls and an adjacent end of said intermediate wall member which divides the interior of said casing into said front and rear compartments, through which curved passage said first sheet is turned over approximately 180° during the movement thereof from said front compartment towards said rear compartment, a portion of said connecting strip between said first mentioned end and another portion of said strip which passes through said second sheet being also turned over within said curved passage.

3. The film pack as claimed in claim 1, wherein each of said second sheets comprises first and second layers joined together to provide an envelope having a first opening adjacent the corresponding solution container, which opening is in communication with a chamber defined in said second sheet by said first and second layers, said first sheet when forming said semi-film unit together with said second sheet being accommodated within said chamber of said second sheet, said second sheet further having a second opening through which said substantially intermediate portion of the corresponding connecting member extends before said semi-film unit is formed, and means for separating said connecting member from said first sheet when the latter has completely been accommodated in the chamber of said second sheet.

4. The film pack as claimed in claim 3, wherein said connecting strip has a width smaller than the width of said first sheet and wherein said first opening is of a size sufficient to allow passage of said first sheet therethrough while said second opening is of a size sufficient to allow passage of said connecting strip, but not to allow passage of said first sheet therethrough.

5. A photographic camera for use with a film assembly of the type including a film pack having a light-transmitting area adapted to be aligned with the optical axis of an objective lens assembly of the photographic camera when said film pack is loaded in said camera, said film pack having front and rear compartments in terms of film exposure direction divided by an intermediate wall member urged in one direction towards said light-transmitting area within said film pack, said film pack accommodating a plurality of first sheets, held in stacked, but light-shielding relation to each other and housed within said front compartment, each of said first sheets having a photosensitive layer exposable to a target object to be photographed through said light-transmitting area by way of said objective lens assembly thereby to form thereon a latent image of said target object, and second sheets equal in number of said first sheets, said second sheets being housed within said rear compartment in stacked relation to each other, each of said second sheets having dimensions generally matching those of said first sheets and further having a breakable container for processing solution carried at one end thereof, and means for guiding successively said first sheets one at a time from said front compartment towards said rear compartment such that any one of said first sheets after having been exposed to the light coming through the objective lens assembly by way of said light-transmitting area is drawn out of said front compartment in a first endwise direction and then turned over approximately 180° into said rear compartment, said first sheet thus drawn being, when entering said rear compartment, moving in a second direction opposed to said first direction, said first sheet so transported to said rear compartment being held in facing contact with the rearmost one of said second sheets to form a semi-film unit, said photographic camera comprising, in combination:

means for positioning the film pack in said photographic camera with the foremost one of said first sheets in terms of exposure direction facing said objective lens assembly through said light-transmitting area of said film pack;

means for transporting any one of said first sheets from said front compartment towards said rear compartment along a first passage extending between said front compartment and said rear compartment, said first passage being so shaped that, when any one of said first sheets, after having been exposed to the incoming light to form the latent image thereon, is drawn out of said front compartment towards said rear compartment, the exposed first sheet is moved in a first direction towards one end of said first passage and, when said exposed first sheet emerges from the opposed end of said first passage, said exposed first sheet is turned over and moved in a second direction opposed to said first direction towards the rear compartment;

means for operating said transporting means so as to cause said exposed first sheet to be transported towards the rear compartment in response to completion of exposure of the foremost one of said first sheets to form the latent image thereon through the objective lens assembly;

means for ejecting said semi-film unit out of said rear compartment and then out of said photographic camera in response to completion of insertion of said exposed first sheet into said rear compartment to form said semi-film unit, said semi-film unit when ejected thereby being moved along a second passage in a direction opposed to the direction of insertion of said exposed first sheet into said rear compartment, said second passage extending from said rear compartment to the outside of said photographic camera and having one end adjacent an elongated slot defined at one end of said film pack, through which elongated slot said semi-film unit is drawn out of said rear compartment, a portion of said second passage adjacent said one end thereof adjoining that end of said first passage through which said exposed first sheet being guided along said first passage emerges from said first passage; and means disposed on said second passage for applying to said semi-film unit being moved along said second passage a squeezing pressure necessary to break the processing solution container to cause the latter to spread over between said exposed first sheet and said associated second sheet forming said semi-film unit thereby developing the visually identifiable image coreesponding to the latent image.

6. The photographic camera as claimed in claim 5, wherein said film pack is constructed by a pair of opposed front and rear panel portions, a pair of opposed end walls and a pair of opposed side walls, said light-transmitting area being defined in said front panel portion and said elongated slot being defined in one of said end walls which is adjacent said respective breakable containers of said second sheets within said rear compartment, said elongated slot so defined being positioned adjacent said rear panel portion and extending intermediately between said opposed side walls, wherein said guiding means includes a second elongated slot defined in said one of said opposed end wals and extending adjacent said front panel portion and between said opposed side walls in spaced relation to said first-mentioned elongated slot, and wherein any of said first sheets when transported from the front compartment towards the rear compartment one at a time emerges from said second elongated slot and then is turned over approximately 180° along said first passage into the rear compartment through said first-mentioned elongated slot, and wherein said first passage being defined in said photographic camera and having the opposed end adjacent said second elongated slot in said film pack and in alignment therewith when said film pack is loaded in said camera;

said transporting means comprises first pawl means operable to move the exposed first sheet a predetermined distance in the first endwise direction with that end of said exposed first sheet extending outwardly from said second elongated slot in said film pack and into said first passage in said photographic camera, and feed roll means positioned along said first passage, said feed roll means operable to feed the exposed first sheet, after having been moved said predetermined distance by said first pawl means, therethrough to said rear compartment; and second pawl means operable to move the semi-film unit, constituted by the exposed first sheet and the corresponding second sheet, a predetermined distance in said second direction towards said second passage and then towards said squeezing pressure applying means.

7. The photographic camera as claimed in claim 6, wherein said operating means includes a source of driving force and wherein said feed roll means includes two pairs of first and second feed rolls, one of said first and second feed rolls of each pair being operatively coupled to said source of driving force for rotating one of said first and second rolls, one pair of said first and second rolls being positioned along said first passage adjacent that end of said first passage through which said exposed first sheet enters said first passage while the other pair of said first and second feed rolls is positioned along said first passage adjacent that end of said first passage through which said exposed first sheet, after having been transported through said first passage, emerges into said rear compartment.

* * * * *